US008559197B2

(12) United States Patent
Cullinane et al.

(10) Patent No.: US 8,559,197 B2
(45) Date of Patent: Oct. 15, 2013

(54) ELECTRICAL CONTROL CIRCUITS FOR AN ENERGY CONVERTING APPARATUS

(75) Inventors: Matthew John Cullinane, Kennewick, WA (US); Allen Peterson, Kennewick, WA (US); Paul Fraser, Richland, WA (US); Gregory Lyle Buchholz, Kennewick, WA (US); Joel Bradley Wacknov, Westlake Village, CA (US)

(73) Assignee: Infinia Corporation, Kennewick, WA (US)

( * ) Notice: Subject to any disclaimer, the term of this patent is extended or adjusted under 35 U.S.C. 154(b) by 828 days.

(21) Appl. No.: 12/634,669

(22) Filed: Dec. 9, 2009

(65) Prior Publication Data

US 2010/0182809 A1  Jul. 22, 2010

Related U.S. Application Data

(63) Continuation-in-part of application No. 12/578,554, filed on Oct. 13, 2009, now Pat. No. 8,151,568.

(60) Provisional application No. 61/121,103, filed on Dec. 9, 2008, provisional application No. 61/183,705, filed on Jun. 3, 2009, provisional application No. 61/104,915, filed on Oct. 13, 2008, provisional application No. 61/196,042, filed on Oct. 13, 2008.

(51) Int. Cl.
 *H02M 5/45* (2006.01)
(52) U.S. Cl.
 USPC .............................................. 363/37; 363/39
(58) Field of Classification Search
 USPC ................................................ 363/34, 37, 39
 See application file for complete search history.

(56) References Cited

U.S. PATENT DOCUMENTS

| 3,479,817 A | 11/1969 | Minto |
| 3,636,706 A | 1/1972 | Minto |
| 3,750,393 A | 8/1973 | Minto |
| 3,951,128 A | 4/1976 | Schoenfelder |
| 4,158,354 A | 6/1979 | Carden |
| 4,291,755 A | 9/1981 | Minto |
| 4,334,521 A | 6/1982 | Jacoby |
| 4,403,643 A | 9/1983 | Minto |

(Continued)

OTHER PUBLICATIONS

"AVR 443: Sensor-based control of three phase Brushless DC motor," 8-bit AVR Microcontrollers, Rev. 2596B-AVR-02/06, Atmel Corporation, 2006, 7 pgs.

(Continued)

*Primary Examiner* — Adolf Berhane
*Assistant Examiner* — Lakaisha Jackson
(74) *Attorney, Agent, or Firm* — K&L Gates LLP

(57) ABSTRACT

In one aspect the invention relates to an electrical circuit for use with a generator having an output port, the circuit to modify one of an electric current or voltage from the generator. The circuit includes a rectifier to convert the alternating current from the generator to direct current, the rectifier having a first port and a second port, the rectifier first port in communication with the output port of the generator; and a direct current to alternating current inverter to convert the direct current from the rectifier to alternating current, the inverter having a first port and a second port, the first port of the inverter in communication with the second port of the rectifier. In one embodiment, the generator is a linear alternator positioned within an energy converting apparatus comprising a Stirling engine having a piston such that motion of the piston drives the linear alternator.

21 Claims, 22 Drawing Sheets

(56) References Cited

U.S. PATENT DOCUMENTS

| | | |
|---|---|---|
| 4,416,255 A | 11/1983 | Secamiglio et al. |
| 4,421,102 A | 12/1983 | Posnansky et al. |
| 4,457,297 A | 7/1984 | Sobczak et al. |
| 4,463,749 A | 8/1984 | Sobczak et al. |
| 4,475,538 A | 10/1984 | Percival et al. |
| 4,502,466 A | 3/1985 | Grahn |
| 4,535,961 A | 8/1985 | Sobczak et al. |
| 4,553,392 A | 11/1985 | Chagnot et al. |
| 4,566,432 A | 1/1986 | Sobczak et al. |
| 4,583,171 A | 4/1986 | Hara et al. |
| 4,583,520 A | 4/1986 | Dietrich et al. |
| 4,602,614 A | 7/1986 | Percival et al. |
| 4,642,547 A | 2/1987 | Redlich |
| 4,718,249 A | 1/1988 | Hanson |
| 4,856,280 A | 8/1989 | Chagnot |
| 4,873,826 A | 10/1989 | Dhar |
| 4,967,558 A | 11/1990 | Emigh et al. |
| 5,069,272 A | 12/1991 | Chagnot |
| 5,074,283 A | 12/1991 | Beatty et al. |
| 5,076,058 A | 12/1991 | Emigh et al. |
| D330,248 S | 10/1992 | Chagnot et al. |
| 5,182,912 A | 2/1993 | Parker et al. |
| 5,183,098 A | 2/1993 | Chagnot |
| 5,228,293 A | 7/1993 | Vitale |
| 5,241,824 A | 9/1993 | Parker et al. |
| 5,263,281 A | 11/1993 | Osborn |
| 5,285,842 A | 2/1994 | Chagnot |
| 5,315,190 A | 5/1994 | Nasar |
| 5,337,562 A | 8/1994 | Kleinwachter et al. |
| 5,404,723 A | 4/1995 | Parker et al. |
| 5,456,256 A * | 10/1995 | Schneider et al. ............ 600/445 |
| 5,522,214 A | 6/1996 | Beckett et al. |
| 5,642,618 A | 7/1997 | Penswick |
| 5,642,622 A | 7/1997 | Berchowitz et al. |
| 5,647,217 A | 7/1997 | Penswick et al. |
| 5,654,596 A | 8/1997 | Nasar et al. |
| 5,685,505 A | 11/1997 | Meckler |
| 5,743,091 A | 4/1998 | Penswick et al. |
| 5,884,481 A | 3/1999 | Johansson et al. |
| 5,889,287 A * | 3/1999 | Yater et al. ...................... 257/14 |
| 5,895,033 A | 4/1999 | Ross et al. |
| 5,918,463 A | 7/1999 | Penswick et al. |
| 5,920,133 A | 7/1999 | Penswick et al. |
| 5,932,029 A | 8/1999 | Stone et al. |
| 5,949,157 A * | 9/1999 | Hirzel ........................... 307/116 |
| 5,994,681 A | 11/1999 | Lloyd |
| 6,036,323 A | 3/2000 | Meijer |
| 6,039,109 A | 3/2000 | Chagnot et al. |
| 6,050,092 A | 4/2000 | Genstler et al. |
| 6,094,912 A | 8/2000 | Williford |
| 6,166,317 A * | 12/2000 | Volk, Jr. ........................ 136/201 |
| 6,470,679 B1 | 10/2002 | Ertle |
| 6,513,326 B1 | 2/2003 | Maceda et al. |
| 6,688,303 B2 | 2/2004 | Davenport et al. |
| 6,701,708 B2 | 3/2004 | Gross et al. |
| 6,809,486 B2 | 10/2004 | Qiu et al. |
| 6,818,818 B2 | 11/2004 | Bareis |
| 6,845,020 B2 * | 1/2005 | Deng et al. ....................... 363/37 |
| 6,871,495 B2 | 3/2005 | Lynch et al. |
| 6,920,967 B2 * | 7/2005 | Wood ............................ 188/380 |
| 6,930,414 B2 | 8/2005 | Qiu |
| 6,931,848 B2 | 8/2005 | Maceda et al. |
| 6,933,629 B2 | 8/2005 | Qui et al. |
| 6,952,921 B2 | 10/2005 | Qiu |
| 6,979,911 B2 | 12/2005 | Otting et al. |
| 6,983,593 B2 | 1/2006 | Gregory et al. |
| 7,026,722 B1 | 4/2006 | Otting et al. |
| 7,084,518 B2 | 8/2006 | Otting et al. |
| 7,088,094 B2 | 8/2006 | VunKannon, Jr. |
| 7,089,735 B1 | 8/2006 | Qiu et al. |
| 7,134,279 B2 | 11/2006 | White et al. |
| 7,137,251 B2 | 11/2006 | Qiu et al. |
| 7,200,994 B2 | 4/2007 | Chertok |
| 7,219,712 B2 | 5/2007 | Qiu et al. |
| 7,297,865 B2 | 11/2007 | Terao et al. |
| 7,325,401 B1 | 2/2008 | Kesseli et al. |
| 7,352,088 B2 | 4/2008 | Qiu |
| 7,511,459 B2 | 3/2009 | Holliday |
| 8,102,145 B2 * | 1/2012 | Merrill et al. ................. 320/104 |
| 2002/0043545 A1 | 4/2002 | Tang |
| 2003/0099124 A1 * | 5/2003 | Meiners ....................... 363/148 |
| 2004/0221576 A1 | 11/2004 | Lynch et al. |
| 2005/0052029 A1 | 3/2005 | Aldridge et al. |
| 2005/0236150 A1 | 10/2005 | Chagnot et al. |
| 2006/0015404 A1 | 1/2006 | Tran |
| 2006/0021343 A1 | 2/2006 | Maceda et al. |
| 2006/0048510 A1 | 3/2006 | White et al. |
| 2006/0179834 A1 | 8/2006 | Qiu |
| 2006/0181157 A1 | 8/2006 | Qiu |
| 2006/0267415 A1 | 11/2006 | Qiu |
| 2006/0283186 A1 | 12/2006 | McConaghy |
| 2007/0120744 A1 | 5/2007 | Silcock et al. |
| 2007/0193266 A1 | 8/2007 | McConaghy |
| 2007/0296391 A1 * | 12/2007 | Bertin et al. .................. 323/303 |
| 2008/0018179 A1 | 1/2008 | Qiu |
| 2008/0122408 A1 * | 5/2008 | Keiter et al. .................... 322/28 |
| 2010/0038976 A1 | 2/2010 | Qiu |

OTHER PUBLICATIONS

PCT International Search Report for PCT Application No. PCT/US2009/067401, mailed Jun. 2, 2010, 4 pgs.

PCT Written Opinion of the International Searching Authority for PCT Application No. PCT/US2009/067401, mailed Jun. 2, 2010, 6 pgs.

* cited by examiner

Stall Circuit Embodiments

Stall Circuit Embodiments

Stall Circuit Embodiments

ELECTRICAL CONTROL CIRCUITS FOR AN ENERGY CONVERTING APPARATUS

CROSS REFERENCE TO RELATED APPLICATIONS

This application claims priority to and the benefit of U.S. Provisional Application No. 61/121,103, filed Dec. 9, 2008, and U.S. Provisional Application No. 61/183,705, filed Jun. 3, 2009. This application is also a continuation-in-part of U.S. patent application Ser. No. 12/578,554, filed Oct. 13, 2009, which claims priority to and the benefit of U.S. Provisional Application No. 61/104,915, filed Oct. 13, 2008, and U.S. Provisional Application No. 61/196,042, filed Oct. 13, 2008. The entire disclosure of each of the above applications is hereby incorporated by reference herein for all purposes.

FIELD OF THE INVENTION

The invention relates generally to the field of energy converting devices such as Stirling engines. Specifically, the invention relates to devices, systems, subsystems, components and methods that control or respond to state changes in energy converting devices.

SUMMARY OF THE INVENTION

The present invention provides energy converting apparatuses such as Stirling machines or engines and related components, methods, apparatuses, and systems with advantageous control systems, stroke regulation, state change monitoring, electrical control and stall circuit configurations, and other properties and features. As a result, there are many novel apparatuses and methods disclosed herein that relate to electronic controls, arrangements of circuit elements, circuits, sensors, transducers, devices that respond to state changes in an energy converting apparatus, and other control elements and methods useful for adapting the Stirling cycle to solar power generation. In general the embodiments described herein can be implemented using single engine, single cylinder/piston, multi-engine or multi-cylinder/piston embodiments.

The invention can include one or more of the following embodiments.

In one embodiment, the invention relates to an electrical circuit for use with a generator having an output port, the circuit to modify one of an electric current or voltage from the generator. The circuit includes a rectifier to convert the alternating current from the generator to direct current, the rectifier having a first port and a second port, the rectifier first port in communication with the output port of the generator; and a direct current to alternating current inverter to convert the direct current from the rectifier to alternating current, the inverter having a first port and a second port, the first port of the inverter in communication with the second port of the rectifier. In one embodiment, the generator is a linear alternator positioned within an energy converting apparatus comprising a Stirling engine having a piston such that motion of the piston drives the linear alternator.

The invention provides, in part, an electrical circuit for use with a generator having an output port. The circuit can be used to modify an electric current or voltage from the generator. The circuit can include a rectifier to convert the alternating current from the generator to direct current, the rectifier having a first port and a second port, the rectifier first port in communication with the output port of the generator; and a direct current to alternating current inverter to convert the direct current from the rectifier to alternating current, the inverter having a first port and a second port, the first port of the inverter in communication with the second port of the rectifier, wherein the generator is a linear alternator positioned within an energy converting apparatus comprising a Stirling engine having a piston such that motion of the piston drives the linear alternator.

The electrical circuit can include a tuning capacitor positioned between the rectifier and the generator, the tuning capacitor having a first port and a second port, the first port in communication with the generator output port and the second port in communication with the first port of the rectifier. The electrical circuit can include a stall circuit having a first port in communication with one of the first and second ports of the tuning capacitor. The rectifier and inverter can be arranged such that current can flow between them bi-directionally. The electrical circuit can include an auxiliary power supply having a first port in communication with the second port of the rectifier, wherein the auxiliary power supply extracts energy from the output of the rectifier. The second port of the inverter can be in communication with an electrical grid and the auxiliary power supply can extract energy from the grid using one of the first port of the inverter if the rectifier is not supplying energy to the output of the rectifier. The auxiliary power supply of the electrical circuit can be in electrical communication with an electrical energy storage device. The electrical circuit can include a switch having a first port and a control port, the first port in communication with the second port of the inverter, and wherein the system controller further comprises an output port in communication with the control port of the switch.

The electrical circuit can include a system controller having a first port, a second port, a third port and a fourth port, the first and second controller ports in communication with the first rectifier port and the third and fourth controller ports in communication with second port of the inverter, wherein the first controller port is a single phase voltage sense port, wherein the second controller port is a single phase current sense port, wherein the third controller port is a 3 phase voltage sense port and is in electrical communication with at least one port of the switch, and wherein the fourth controller port is a 3 phase current sense port. The electrical circuit can include a system controller having a first port, a second port, a third port and a fourth port, the first and second controller ports in communication with the first rectifier port and the third and fourth controller ports in communication with second port of the inverter, wherein the switch comprises a third port in electrical communication with a power grid, wherein the first controller port is a single phase voltage sense port, wherein the second controller port is a single phase current sense port, wherein the third controller port is a 3 phase voltage sense port and is in electrical communication with the third port of the switch, and wherein the fourth controller port is a 3 phase current sense port and is in electrical communication with the third port of the switch.

The invention also provides, in part, an energy converting system which, in some embodiments, is part of the energy converting apparatus. The energy converting system can include a linear alternator positioned within an energy converting apparatus comprising a Stirling engine having at least one operating frequency and a piston such that motion of the piston drives the linear alternator, the Stirling engine powered by incident solar energy, a tuning capacitor in electrical communication with the linear alternator, and a stall circuit comprising an electrical load in electrical communication with the tuning capacitor such that the stall circuit in combination with the tuning capacitor has a predetermined resonant frequency and bandwidth such that when the stall circuit is connected to the linear alternator the Stirling engine enters a stall state. The stall circuit can be selected from, for example, on or more of a resistor, a resistor and capacitor, a pair of capacitors, and a brake. The bandwidth can range from, for example, from about 58 Hz to about 72 Hz and the predetermined resonant frequency is approximately 62 Hz. In addition, the stall circuit can include a resistor capacitor pair, the resistor capacitor pair when in communication with the tuning capacitor generates an impedance that when connected to the linear alternator stalls the linear alternator. The stall circuit has an associated bandwidth sized to stall an energy converting apparatus component selected from one or more of an engine having at least one piston, a passive balancer, and a linear alternator. The stall circuit can be used with a passive balancer connected to a case which houses the Stirling engine and a circuit component value of at least one circuit component in the stall circuit can be selected in response to at least one resonance frequency associated with a moving mass component of the energy converting apparatus.

The invention also provides, in part, a motor controller for a positioning an object. The motor controller can include a DC brushless motor having a Hall sensor, a Hall sensor port, and a motor driver having a motor driver port, a gear box in communication with the DC brushless motor and having a gear ratio greater than 200:1, and a position controller having an input port in communication with the Hall sensor and an output port in communication with the motor driver port, wherein the Hall sensor provides information for commutation control to the motor driver and motion information to the position controller for position determination of the object.

The invention also provides a method of calibrating beam position in a solar energy converting apparatus. The method can include the steps of detecting one of a temperature or temperature changes at a plurality of locations, the locations positioned relative to a beam target region; and determining the location of the beam target region in response to differences in the temperature or temperature changes measured at the plurality of locations. Various embodiments of the method can include one or more of the following features. The method can include the steps of scanning a beam of solar radiation across a first location of the plurality of locations to determine the location of the beam target region along a first path; and scanning a beam of solar radiation across a second location of the plurality of locations to determine the location of the beam target region along a second path, wherein determining the location of the beam target region is based on a geometric relationship of the first path and the second path. Each distance between the location of the beam target region and each of the plurality of locations can be predetermined before each of the scanning steps. Moreover, a temperature sensor can be positioned at each of the plurality of locations. In some embodiments, at least one of the scanning steps comprises stopping at one of the plurality of locations, and in some embodiments, at least one of the scanning steps terminates when the temperature sensors are detecting a substantially similar temperature value.

The invention also provides, in part, a system for converting solar energy into electricity. The system can include an energy converting apparatus including an incident solar energy receiving surface aligned to receive solar energy reflected from a solar energy concentrator; a light sensor positioned relative to the surface to sense the presence or absence of sunlight; a shadow generating member positioned to cast a shadow on the light sensor when the concentrator is substantially centered along one direction; and a control system programmed to move a beam of incident solar region to a target region in response to the shadow being cast on the light sensor.

The invention also provides, in part, a method of controlling a Stirling engine having a piston connected to a linear alternator, the linear alternator generating a voltage and current through an impedance to a load. Various embodiments of the method can include one or more of the following features. The method can include the steps of periodically measuring a voltage amplitude produced by the linear alternator to generate a plurality of measured voltage amplitude values; monitoring the measured voltage amplitude values; and changing an impedance value in response to the step of comparing the voltage amplitude to the predetermined value. The monitoring step can include detecting deviations in the measured voltage amplitude values relative to each prior measured voltage amplitude value or a predetermined value. Impedance can be controlled through pulse-width modulation of a rectifier in series with a tuning capacitor which is connected to the output of the linear alternator. In addition, the method can include the steps of detecting when a piston has reached maximum amplitude and if such a maximum amplitude is detected, reducing piston stroke by decreasing a control voltage. The method can also include the steps of monitoring one of current or heat sink temperature and increasing a control voltage if a maximum value of either the current or heat sink temperature is exceeded.

The invention also provides, in part, a method of controlling an energy converting apparatus comprising an engine having a piston connected to a linear alternator, the linear alternator generating a voltage and current through an impedance to a load, the engine powered by light concentrated by a reflector and actively cooled by a coolant. The method can include the steps of measuring a first electrical parameter produced by the linear alternator; comparing the first electrical parameter with respect to a predetermined value; and changing at least one of a system parameter selected from the group comprising: reflector position, coolant flow, and impedance, in response to the step of comparing the first electrical parameter to the predetermined value. Various embodiments of the method can include one or more of the following features. The first electrical parameter can be selected from one or more of an amplitude of the voltage, an impedance, a resonance frequency, a bandwidth, a frequency, a time varying voltage, a current value, a fixed current, and a time varying current. The fluid can be a liquid coolant and the parameter can be a flow rate. In addition, the predetermined value can be a prior measurement of the first electrical parameter.

The invention also provides, in part, a method of centering a beam of incident solar energy relative to a target region of an energy converting apparatus comprising a Stirling engine and a solar energy concentrator for directing energy to the target region. The method can include sensing temperature using a plurality of sensors positioned at locations relative to the target region, wherein at least one of the plurality of sensors is exposed to unbalanced heating relative to at least another of the plurality of sensors; and moving the concentrator until feedback from each of the plurality of sensors is balanced. In some embodiments, the method can also include positioning the concentrator until an average or a sum of temperatures sensed at each of the plurality of sensors is substantially minimized.

The invention also provides, in part, a method of generating control system feedback for an energy converting apparatus comprising a Stirling engine and a concentrator attached to the engine to direct solar energy such that the solar energy drives the engine. The method can include detecting a energy converting apparatus parameter selected from the group consisting of engine power, heater head temperature, temperature, a first derivative of engine power, a first derivative of heater head temperature, and a first derivative of temperature; and adjusting one of a position of the concentrator, an electrical parameter, or a mechanical parameter of the energy converting apparatus in response to a change in the energy converting apparatus parameter. Various embodiments of the method can include one or more of the following features. The method can include the step of adjusting comprises moving the concentrator until the energy converting parameter is maximized. The electrical parameter can be selected from one or more of a voltage amplitude, an impedance, a resonance frequency, a bandwidth, a frequency, a time varying voltage, a current value, a fixed current, and a time varying current. In addition, the mechanical parameter can be selected from one or more of coolant flow and air flow.

The invention also provides, in part, a method of controlling an engine having a piston connected to a linear alternator, the engine heated by solar radiation concentrated by a reflector such that the engine generates power using a piston stroke. The method can include the steps of sensing a temperature of the engine to obtain a sensed temperature; comparing the sensed temperature to a temperature threshold; detecting when the sensed temperature and the temperature threshold differ by a predetermined amount; and adjusting the piston stroke using a stroke controller when the sensed temperature and the temperature threshold differ by the predetermined amount until an engine temperature returns to an operating temperature range. Various embodiments of the method can include one or more of the following features. The sensing can be performed over time and the sensed temperature can be the first derivative of temperature with respect to time. The sensed temperature can range from, for example, about negative 20 degrees Celsius to about 620 degrees Celsius and the predetermined amount can range from, for example, about 1 degree Celsius to about 10 degrees Celsius.

The invention also provides, in part, a processor-based system for controlling an energy converting apparatus comprising a Stirling engine. The system can include an electronic memory device; and an electronic processor in communication with the memory device, wherein the memory device comprises instructions that when executed by the processor cause the processor to: monitor changes in a first derivative with respect to time of a temperature at a region of the energy converting apparatus, and varying an operational state of a control system in response to a change in the first derivative with respect to time of the temperature.

The invention also provides, in part, a processor-based system for controlling an energy converting apparatus comprising a Stirling engine, a first subsystem having a cold side temperature and a second subsystem having a hot side temperature, an engine working fluid disposed within a chamber, and a piston which moves relative to the working fluid. The processor-based system can include an electronic memory device; and an electronic processor in communication with the memory device, wherein the memory device comprises instructions that when executed by the processor cause the processor to: store an empirically obtained dataset of energy converting apparatus operating parameters, and determine an operating temperature ratio, wherein the operating temperature ratio is the ratio of the cold side temperature to the hot side temperature. Various embodiments of the system can include one or more of the following features. The operating temperature ratio can be determined by correlating electric power, charge pressure of engine working fluid, and piston amplitude using the dataset of energy converting apparatus operating parameters. The energy converting apparatus can include a linear alternator and the piston amplitude can be approximated by a control voltage associated with the linear alternator. The operating temperature ratio can be determined inferentially such that a direct temperature measurement is not used.

The invention also provides, in part, a method for determining hot-side temperature of a Stirling engine having an alternator and a rectifier. The method can include the steps of: determining empirically a temperature ratio as a function of electric power, engine working fluid charge pressure, and piston amplitude; determining empirically a correlation between alternator temperature and working fluid charge pressure and storing the relationship in computer memory; determining heat rejected from electric power value using a processor; determining actual alternator temperature by subtracting ambient temperature from rejected heat using the processor; and calculating hot-side temperature by multiplying cold-side temperature by the temperature ratio using the processor. In some embodiments, the actual alternator temperature is determined using a conduction loss parameter.

The invention also provides, in part, a processor-based method for determining cold-side temperature of a Stirling engine having a cold side heat exchanger. The method can include the steps of approximating the amount of heat absorbed by the Stirling engine using a processor; calculating the amount of heat rejected by the Stirling engine using the processor; determining rejection temperature as a function of ambient temperature using the processor; and calculating the cold-side temperature of the Stirling engine using a predetermined thermal resistance associated with a cold side heat exchanger. In some embodiments, the method includes the step of generating temperature feedback using the calculated cold-side temperature such that a direct temperature measurement is unnecessary; and transmitting the temperature feedback to a control system.

Further, apparatuses and methods disclosed herein relate to accurately controlling and protecting complex systems and subsystems within Stirling engines and devices that adapt the Stirling cycle to solar power generation.

In one embodiment, a rectifier can be coupled to the engine, with or without tuning capacitor. A rectifier can be coupled to an inverter which is then coupled to grid and/or load. A rectifier can be used to control engine stroke via control of terminal voltage, with or without constraining current or frequency. An inverter can be used to regulate a DC bus and provide power compliant to the grid or load requirements. In one embodiment, inverter and/or rectifier flow power can be bi-directional relative to a power grid and an energy converting apparatus. For the rectifier, power can flow to the engine for motoring to aid heater head temperature distribution and engine starting. For the inverter, power can flow from the grid to the DC bus to provide power for a number of purposes, including operation of pump, fans, dish motors, battery chargers, and other components.

Various embodiments permit sensorless control of the engine without, for example, a piston position sensor. In addition, the invention can include an active rectifier with no piston position sensing.

The invention also provides a dish motor power sourced from at least one of the following sources: grid power, engine power, and energy storage (battery, capacitor, etc). Upon loss of one source, redundant sources can ensure that sufficient power is available at least to safely stow the dish. For example, in some embodiments, by modifying circuit configurations it is possible to continue running the engine when grid power is lost, thus using engine power to stow the dish.

The invention also provides an electrical load that, when applied, can exceed the power produced by the engine at any given time. For example, a load that has a resonant frequency and bandwidth selected in coordination with the engine frequency range, balancer natural resonant frequency (if employed), and other moving parts of the engine, can be used to stall the engine when the load is applied.

In one embodiment, the invention relates to a mechanical assembly that includes a solar energy collector, typically a reflective surface or an array of mirrors, and an energy converting apparatus. In one embodiment, the energy converting apparatus includes a Stirling cycle engine. A free-piston Stirling engine embodiment can be configured such that both the collector and the energy converting apparatus are elevated relative to the ground on a pier to enable better solar energy collection and engine positioning.

One embodiment provides a system for converting solar energy into electricity. The system can include: a solar energy concentrator including a non-planar front surface including plurality of panels defining the non-planar front surface, each panel including a plurality of edges; a boom; and an energy converting apparatus. The energy converting apparatus can include an incident solar energy receiving surface aligned to receive solar energy reflected from the solar energy concentrator; a ring frame including a plurality of supporting members and a top substantially circular region including an outer circumference and an inner circumference and including a plurality of attachment mounts; and an engine disposed within an engine housing suspended within the inner circumference and substantially perpendicular to the top substantially circular region, the boom connecting and aligning the energy converting apparatus and the solar energy concentrator. In some embodiments, the concentrator has a focal point positioned at a point offset relative to the incident solar energy receiving surface.

In some embodiments, the system includes a temperature sensor positioned to detect temperature changes in the incident solar energy receiving surface. In some embodiments, the system includes a drive unit connected to the solar energy concentrator and the temperature sensor, the drive unit programmed to misalign the concentrator with a source of solar energy and reduce an amount of solar energy impinging on the incident solar energy receiving surface when the temperature measured by the temperature sensor exceeds a predetermined threshold.

In some embodiments, each panel includes a non-planar surface, wherein the non-planar surface includes a first portion including a first edge and a second edge, the first and second edges being radially oriented with respect to the center of the concave reflector when the panel is positioned in the concave reflector; wherein the non-planar surface comprises a second portion including a third edge and a fourth edge, the third and fourth edges are radially oriented with respect to a second center that is nonconcentric with the center of the concave reflector when the panel is positioned in the concave reflector; and wherein when assembled in the concave reflector, the concave reflector includes a slot, running to the circumference of the reflector from substantially the center of the reflector, the slot having parallel edges.

In some embodiments, n panels comprise the plurality of panels, wherein n is an integer greater than two, the panels arranged such that a non-planar concave dish is formed from the arrangement of the n panels, the non-planar concave dish defining a star shaped hole and the slot formed from a plurality of edges of the n panels, the n panels are substantially identical in shape.

In some embodiments, the concave dish is oversized to provide excess solar energy relative to a relative maximum amount of solar energy that the energy converting apparatus can tolerate before overheating.

In some embodiments, each of the plurality of attachment mounts are substantially perpendicular to the top substantially circular region.

In some embodiments, the system includes an elongate slew plate connected to the outer circumference of the substantially circular region, the elongate slew plate defining an attachment point for a cover, the cover sized to substantially surround the energy converting apparatus while leaving the incident solar energy receiving surface exposed to receive solar energy.

In some embodiments, the system includes a vibration transmission reduction system for reducing the transmission of vibrations between the engine housing and a frame. The system can include: a plurality of isolation springs, each isolation spring forms a circular mount within which is positioned the engine housing, the circular mount is attached to the frame; and a passive balancer attached to the engine housing. In some embodiments, the plurality of isolation springs are arranged to form a cylindrical mounting structure having a longitudinal axis. In some embodiments, the engine and the passive balancer are aligned along the longitudinal axis or an axis parallel to the longitudinal axis. In some embodiments, the axial spring stiffness of the isolation springs is selected in response to the gravity load so as to ensure the engine housing remains in a predetermined axial tolerance band. In some embodiments, the predetermined axial tolerance band range from about 0 mm to about 0.6 mm. In some embodiments, the circular mount is attached to the ring frame. In some embodiments, the frame is a ring frame including a plurality of supporting members and a top substantially circular region, wherein the isolation springs are flexures, wherein the engine housing and passive balancer are suspended by the flexures.

In some embodiments, the concentrator includes a chassis, and the chassis includes a first mating surface and a second mating surface, both mating surfaces sandwiching a plurality of elongate members which radiate outward from a common center, each of the plurality of panels attached to at least one elongate member. In some embodiments, the system includes a biaxial drive assembly supported by a pier and connected to the chassis. In some embodiments, the biaxial drive assembly is configured for causing rotation of the concentrator about two orthogonal axes. The biaxial drive assembly can include: a first drive unit having a first axis of rotation; and a second drive unit having a second axis of rotation and offset from the first drive unit, the second drive unit is positioned separate from first drive unit such that the first and second axes of rotation are orthogonal but do not intersect. In some embodiments, the first and second drives cause the chassis to move, the first drive unit causes rotation of the chassis about a vertical axis of rotation of the first drive unit; the second drive unit causes rotation of the chassis about a horizontal axis of rotation of the second drive unit, and when the second drive unit has caused a rotation of the chassis about the horizontal axis of the second drive unit so as to cause the directional axis of the chassis to be vertical, the directional axis of the chassis is parallel to but non-coincident with vertical axis of rotation of the first drive unit. In some embodiments, the first axis is an azimuth axis that is offset from the second axis, the second axis is an elevation axis. In some embodiments, wherein the azimuth axis is normal to level ground and configured to move an object based on compass direction. In some embodiments, at least two of the plurality of edges define a slot.

One embodiment provides a panel for use in a substantially concave reflector. The panel can include a non-planar surface, wherein the non-planar surface has a first portion including a first edge and a second edge, the first and second edges being radially oriented with respect to the center of the concave reflector when the panel is positioned in the concave reflector, wherein the non-planar surface has a second portion including a third edge and a fourth edge, the third and fourth edges not radially oriented with respect to the center of the concave reflector when the panel is positioned in the concave reflector; and wherein when assembled in the concave reflector, the concave reflector includes a slot, running to the circumference of the reflector from substantially the center of the reflector, the slot having parallel edges.

In some embodiments, the panel further includes a rear surface and wherein the rear surface includes a plurality of attachment bosses, each attachment boss capable of being attached to an elongate member of the conclave reflector to thereby form the concave reflector having a predetermined focal point. In some embodiments, a substantially circular region defining a first hole and a plurality of triangular shaped regions defining a plurality of holes are formed when the concave reflector is assembled. In some embodiments, the slot defines a first area substantially equal to a second area defined the first hole and plurality of holes. In some embodiments, the panel includes a structural substrate, a top surface including a reflective surface, and a bottom surface including a plurality of attachment bosses, the attachment bosses disposed such that the panel can be attached to at least one elongate member. In some embodiments, the reflective surface includes a plurality of tiles. In some embodiments, the elongate member includes a rib.

One embodiment provides a panel for use in a substantially concave reflector. The panel can include a non-planar surface, the surface defining a sector of the concave reflector, the non-planar surface including a first edge and a second edge, the first edge and second edge radially oriented relative to a first center; the non-planar surface including a third edge and a fourth edge, the third edge and the fourth edge radially oriented relative to a second center. In some embodiments, the orientation of each of the edges is such that when a plurality of the panels are arranged to form a concave reflector a slot is defined in the concave reflector.

One embodiment provides a kit for forming a concave reflector. The kit can include: a plurality of elongate members; and a plurality of panels. Each panel can include: a non-planar surface, wherein the non-planar surface includes a first portion including a first edge and a second edge, the first and second edges being radially oriented with respect to the center of the concave reflector when the panel is positioned in the concave reflector, wherein the non-planar surface includes a second portion including a third edge and a fourth edge, the third and fourth edges are radially oriented with respect to a second center that is nonconcentric with the center of the concave reflector when the panel is positioned in the concave reflector; and wherein when assembled in the concave reflector, the concave reflector includes a slot, running to the circumference of the reflector from substantially the center of the reflector, the slot having parallel edges.

One embodiment provides a solar energy concentrator. The concentrator can include n panel segments, wherein n is an integer greater than two, the panel segments arranged such that a non-planar concave dish is formed from the arrangement of the n panel segments, the non-planar concave dish defining a star shaped hole and a slot formed from a plurality of edges of the n panel segments.

One embodiment provides an alignment tool for use in assembling a concave reflector, where the concave reflector can include a hub plate, the hub plate including a first alignment point, and a plurality of elongate members, each of the plurality of elongate members including a hub end for attachment to the hub and a distal end, the distal end including a second alignment point. The alignment tool can include an elongate body portion including a first end and a second end; a first attachment unit located at the first end of the elongate body portion; and a second attachment unit located at the second end of the elongate body portion, wherein the first attachment unit is for attaching the alignment tool to the first alignment point on the hub plate, and the second attachment unit for attaching the alignment tool to the second alignment point of the elongate member to thereby align each elongate member with respect to the hub plate prior to fixation of the elongate member to the hub plate.

One embodiment provides a method of assembling a reflector unit including: a hub plate, the hub plate including a first alignment point; a plurality of elongate members, each of the plurality of elongate members including a hub end for attachment to the hub plate and a distal end, the distal end including a second alignment point; and a plurality of panels. The method of assembly uses an alignment tool which includes an elongate body portion including a first end and a second end; a first attachment unit located at the first end of the elongate body portion; and a second attachment unit located at the second end of the elongate body portion. The method can include the steps of: attaching an elongate member to the hub plate; attaching the first attachment unit of the alignment tool to one first alignment point on the hub plate; attaching the second attachment unit of the alignment tool to the second alignment point of the elongate member; aligning the elongate member with respect to the hub plate; fixing elongate member to the hub plate; repeating each step for each elongate member of the plurality of elongate members; once the elongate members have been affixed to the hub plate, affixing each of the plurality of panels to the elongate members.

One embodiment provides a method of assembling a collector having a central axis for use with an energy converting apparatus. The method can include the steps of sandwiching a plurality of elongate members between a first substantially planar mating surface and a second substantially planar mating surface, each elongate member including two substantially collinear pins located on either side of a first end of each elongate member, each mating surface defining a plurality holes, each hole sized to receive one of the pins; and securing the substantially planar mating surfaces such that the collinear pins are positioned within corresponding holes in each respective mating surface such that the mating surfaces are perpendicular to the central axis and a second end of each of the structural members radiates outward away from the central axis. In some embodiments, the method can include the step of attaching a plurality of panel segments to the plurality of elongate members. In some embodiments, each panel segment includes attachment bosses on a first side and a reflective surface on a second side. In some embodiments, the method can include the step of aligning all of the panel segments to form a collector focus point at a location above the collector. In some embodiments, the alignment step is performed by sequentially tightening a plurality of fastener elements positioned to attach the panels to the elongate members by a prescribed amount.

One embodiment provides a drive assembly for causing rotation about two orthogonal axes. The drive assembly can include: a first drive unit having a first axis of rotation; and a second drive unit having a second axis of rotation, wherein the second drive unit is positioned separate from first drive unit such that the first and second axes of rotation are orthogonal but do not intersect. In some embodiments, the first and second drives cause a body having a directional axis to rotate, the first drive unit causes rotation of the body about a vertical axis of rotation of the first drive unit; the second drive unit causes rotation of the body about a horizontal axis of rotation of the second drive unit, wherein when the second drive unit has caused a rotation of the body about the horizontal axis of the second drive unit so as to cause the directional axis of the body to be vertical, the directional axis of the body is parallel to but non-coincident with vertical axis of rotation of the first drive unit. In some embodiments, the first axis is an azimuth axis that is offset from the second axis, the second axis is an elevation axis. In some embodiments, the azimuth axis is normal to level ground and configured to move an object based on compass direction. In some embodiments, the elevation axis is configured to move an object through a plurality of elevations. In some embodiments, the elevation axis is arranged relative to the azimuth such that a top surface of the first drive unit is defines a hole through which cabling can be routed. In some embodiments, the first drive unit has a first origin and a first coordinate system and wherein the second drive unit has a second origin and a second coordinate system such that the first origin and the second origin are offset relative to each other.

One embodiment provides a pier assembly for supporting a two axis rotatable object. The pier assembly can include: a base; a hollow elongate member extending from the base; and a drive assembly for causing rotation of the object about two orthogonal axes. The drive assembly can include: a first drive unit having a first axis of rotation; and a second drive unit having a second axis of rotation, wherein the second drive unit is positioned separate from first drive unit such that the first and second axes of rotation are orthogonal and offset relative to each other such that each axis does not intersect the other. In some embodiments, the first drive unit includes a surface defining a hole that connects to the hollow elongate member. In some embodiments, the hole is sized to receive a wire or cable.

One embodiment provides a vibration transmission reduction system for reducing the transmission of vibrations between an engine housing and a frame. The system can include: a plurality of isolation springs, each isolation spring forms a circular mount within which is positioned the engine housing, the circular mount is attached to the frame; and a passive balancer attached to the engine housing. In some embodiments, the plurality of isolation springs are arranged to form a cylindrical mounting structure having a longitudinal axis. In some embodiments, the system can include a heater head, engine, and passive balancer arranged along a common longitudinal axis, the engine disposed within the engine housing. In some embodiments, the axial spring stiffness of the isolation springs is selected in response to the gravity load so as to ensure the engine housing remains in a predetermined axial tolerance band. In some embodiments, the predetermined axial tolerance band ranges from about 0 mm to about 0.6 mm. In some embodiments, the frame is a ring frame including a plurality of supporting members and a top substantially circular region. In some embodiments, the circular mount is attached to the ring frame. In some embodiments, the frame is a ring frame including a plurality of supporting members and a top substantially circular region, wherein the isolation springs are flexures, wherein the engine housing, heater head and passive balancer are suspended by the flexures. In some embodiments, the engine housing, heater head and passive balancer are suspended by the ring frame and maintained in collinear alignment using the circular mount.

One embodiment provides a method for reducing overinsolation of a heat exchanger. The method can include the steps of: providing a heat exchanger having a surface area for absorbing solar radiation; concentrating solar radiation on the surface area of the heat exchanger such that the concentrated solar radiation impinges on a portion of the entire surface area of the heat exchanger; and moving the concentrated solar radiation about the surface area of the heat exchanger. In some embodiments, the step of moving the concentrated solar radiation includes moving the concentrated solar radiation in a pattern. In some embodiments, the pattern is substantially circular. In some embodiments, the solar radiation is moved about the surface at about 1 to about 30 revolutions per minute. In some embodiments, the step of moving the concentrated solar radiation includes randomized movement of the concentrated solar radiation. In some embodiments, concentrated light impinges on less than about 100% of the entire surface area of the heat exchanger. In some embodiments, the method can include the step of reducing the portion of the surface area onto which concentrated solar radiation impinges when the temperature of the heat exchanger reaches a predetermined limit, thereby reducing thermal input. In some embodiments, the method can include the step of providing a solar concentrator or components thereof. In some embodiments, the method can include the step of providing a Stirling engine. In some embodiments, the Stirling engine is configured to be in thermal communication with the heat exchanger. In some embodiments, the heat exchanger is in thermal communication with an energy converting apparatus, the energy converting apparatus selected from the group consisting of a chemical energy conversion device, a thermal energy storage device, a gas turbine, a multi-cylinder engine, a multi-piston engine, a steam turbine, a steam power tower, a fuel cell, and a water-based energy generation systems.

One embodiment provides a method for extending the use-life of a solar heat exchanger. The method can include the steps of: providing a solar concentrator; providing a heat exchanger; providing an aperture between the heat exchanger and the solar concentrator; directing a concentrated beam of the solar radiation from the solar concentrator through the aperture; and when the temperature of the heat exchanger reaches a predetermined limit, reducing the amount of solar radiation which passes through the aperture, thereby reducing the amount of solar radiation impinging on the heat exchanger. In some embodiments, the solar concentrator is a reflective dish. In some embodiments, the step of reducing the amount of solar radiation includes misaligning the solar concentrator and the aperture.

One embodiment provides a method for reducing overinsolation of a heat exchanger. The method can include the steps of: providing a solar concentrator; providing a Stirling engine; providing a heat exchanger having a surface area, the heat exchanger being in thermal communication with the Stirling engine; providing an aperture between the heat exchanger and the solar concentrator; aligning the solar concentrator and the aperture such that a fraction of the solar radiation from the solar concentrator passes through the aperture, wherein the fraction of solar radiation impinges on a portion of the surface area of the heat exchanger; and moving the solar radiation about the surface area of the heat exchanger. In some embodiments, the method includes the step of reducing the portion of the surface area onto which concentrated solar radiation impinges when the temperature of the heat exchanger reaches a predetermined limit, thereby reducing thermal input. In some embodiments, the method includes the step of moving the concentrated solar radiation such that substantially no concentrated solar radiation impinges on the heat exchanger when a predetermined maximum temperature, power, pressure, swept volume, resistance, current, or position, is reached.

One embodiment provides a method for using an over-sized solar concentrator. The method can include the steps of: providing an over-sized solar concentrator; providing a heat exchanger; providing an aperture between the heat exchanger and the over-sized solar concentrator; during non-peak solar conditions, directing substantially all of the solar radiation from the solar concentrator through the aperture; and during peak solar conditions, reducing the amount of solar radiation which passes through the aperture and moving the solar radiation about the surface area of the heat exchanger, thereby reducing thermal input. In some embodiments, the over-sized solar concentrator is capable of producing about 3 $kW_e$ when solar insolation is about 850 $W/m^2$. In some embodiments, the over-sized concentrator is capable of producing about 10$W_e$ when solar insolation is about 100 $W/m^2$. In some embodiments, the method includes the step of providing a Stirling engine. In some embodiments, the Stirling engine is configured to be in thermal communication with the heat exchanger. In some embodiments, the over-sized solar concentrator is capable of concentrating more solar radiation than can be thermally processed by the heat exchanger or Stirling engine.

One embodiment provides an apparatus which can include: a Stirling engine; a heat exchanger in communication with the Stirling engine; a solar concentrator for concentrating solar energy onto the heat exchanger; and an aperture between the solar concentrator and the heat exchanger for controlling the amount of solar energy which reaches the heat exchanger. In some embodiments, the solar concentrator is a dish. In some embodiments, the dish has a reflective surface. In some embodiments, the apparatus includes a housing for shielding the Stirling engine from the concentrated solar energy. In some embodiments, at least a portion of the housing is configured to reduce thermal or solar absorbance. In some embodiments, a thermal spray is applied to the housing.

One embodiment provides a method for extending the use-life of a solar heat exchanger. The method can include the steps of: providing a solar concentrator; providing a heat exchanger; providing an electromagnetic radiation path between the heat exchanger and the solar concentrator; directing most of the solar radiation from the solar concentrator along the electromagnetic radiation path; and reducing the amount of solar radiation impinging on the heat exchanger in response to sensor feedback. In some embodiments, the method includes the step of reducing the rate at which the heat exchanger heats. In some embodiments, the method includes the step of moving the concentrated solar radiation about the surface area of the heat exchanger.

One embodiment provides a method for using an over-sized solar concentrator. The method can include the steps of: providing an over-sized solar concentrator; providing a heat exchanger; providing an electromagnetic radiation path between the heat exchanger and the over-sized solar concentrator; during non-peak solar conditions, directing most of the solar radiation from the solar concentrator through the electromagnetic radiation path; and during peak solar conditions, reducing the amount of solar radiation which passes through the electromagnetic radiation path and moving the solar radiation about the surface area of the heat exchanger, thereby reducing thermal input, spreading hot spots, reducing the rate at which the heat exchanger heats, and/or maintaining coolant temperature.

One embodiment provides a method for improving performance of an energy converter system. The method can include the steps of: providing a heat exchanger having a surface area for absorbing thermal energy; concentrating thermal energy on a portion of the surface area of the heat exchanger; and moving the concentrated thermal energy about the surface area of the heat exchanger, thereby reducing thermal input, spreading hot spots, reducing the rate at which the heat exchanger heats, and/or maintaining coolant temperature.

In general, various details and dimensions relating to an energy converting apparatus system are provided below. Although in one preferred embodiment the systems described below relate to a 3 kilowatt energy converting apparatus whereby solar energy is converted to electrical power, the embodiments and dimensions thereof described herein are not intended to be limiting, but are provided to be illustrative examples.

All of the proceeding embodiments can be combined together individually or in the aggregate and all such embodiments are within the scope of the invention. In addition, all methods and techniques described herein can be implemented as stand alone methods or as a processor-based system or method. In one embodiment, such a system includes an electronic memory device; and an electronic processor in communication with the memory device, wherein the memory device comprises instructions that when executed by the processor cause the processor to execute one or more of the method steps described herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The drawings associated with the disclosure are addressed on an individual basis within the disclosure as they are introduced.

DETAILED DESCRIPTION

Figure 1:
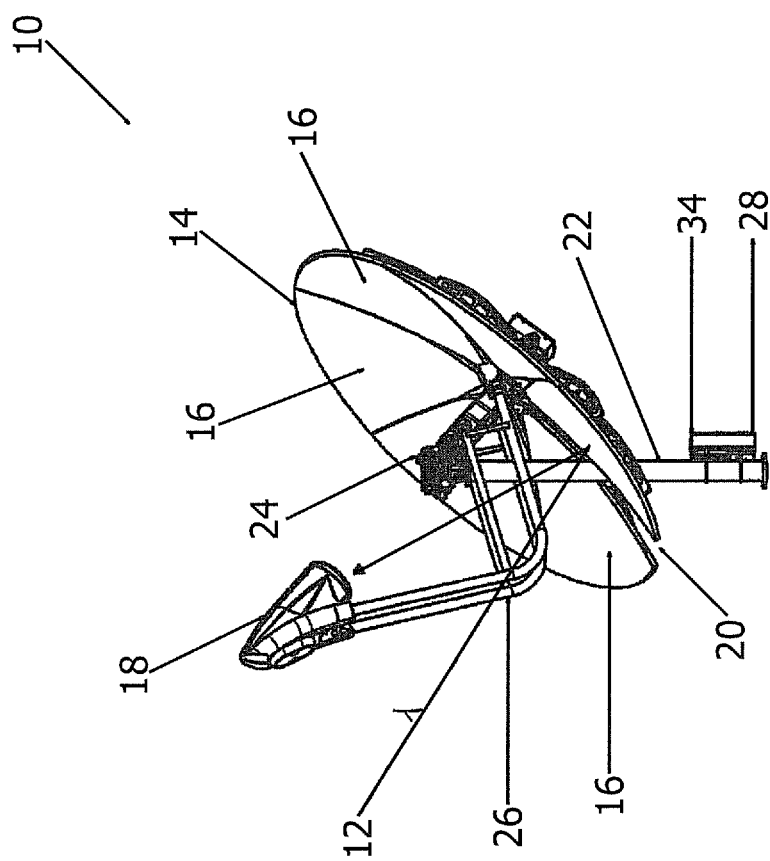
FIG. 1 is an energy converting system in accordance with an illustrative embodiment of the invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention, rather the scope of the present invention is defined by the claims.

It should be understood that the order of the steps of the methods of the invention is immaterial so long as the invention remains operable. Moreover, two or more steps may be conducted simultaneously or in a different order than recited herein unless otherwise specified.

The use of sections or headings in the application is not meant to limit the invention; each section and heading can apply to any aspect, embodiment, or feature of the invention.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

In the application, where an element or component is said to be included in and/or selected from a list of recited elements or components, it should be understood that the element or component can be any one of the recited elements or components, or can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The terms "a," "an," and "the" mean "one or more," unless expressly specified otherwise.

The foregoing, and other features and advantages of the invention, as well as the invention itself, will be more fully understood from the description, drawings, and claims.

The aspects and embodiments of the invention disclosed herein relate to devices, systems, subsystems, components and methods that control or respond to state changes in energy converting devices such as Stirling machines or engines. Without being limited to a particular theory or mechanism, in some embodiments the Stirling engine and related system components use a working fluid (typically air, Helium, Nitrogen or Hydrogen gas) in a closed cylinder containing a piston. As part of its operation, the expansion (heating) and contraction (cooling) of the gas drives the piston back and forth in the cylinder. The work performed by this piston-motion is used to drive a generator (such as linear alternator) and produce electricity or to create pressure waves to drive a compression process. In one embodiment, a plurality of free pistons is used. In one embodiment, the generator includes two terminals, the + and −, which alternate with AC.

In way of further detail, the arrangement of moving masses used in one embodiment of the energy converting apparatus includes an engine case or housing, a mover, which includes a power generating piston, a displacer (which can include a mass used to displace the working fluid), and a passive balancer. All of these various elements are coupled together either directly or indirectly and vibrate and move to varying degrees.

In some embodiments, the Stirling machines and related technologies are configured to collect solar energy and convert it to electricity or useful work as part of an energy converting apparatus. Since the Stirling engines described herein use a closed system containing a fluid, electrical subsystems, cooling subsystems, and other elements that are subjected to significant heating, different embodiments of the invention relating to heat exchangers and over-insolation control are beneficial to the device operation. "Insolation" is a measure of solar radiation energy received on a given surface area in a given time. Accordingly, "over-insolation" is an excess of solar radiation energy (i.e., more solar radiation than the system can thermally process) received on a given surface area in a given time.

An exemplary system suitable for converting solar energy into electricity or mechanical work is shown in FIG. 1. Although solar energy, sunlight, thermal energy, and other terms are used throughout, they are not intended to limit the embodiments herein. In general, the invention relates to devices, systems, subsystems, components and methods that control or respond to state changes in energy converting devices.

It will be appreciated that the apparatus described herein and its many components can be sized and scaled according to the desired size of the energy converting apparatus. Thus, while references may be made to the size of the apparatus and/or its individual components, such references are for illustrative purposes only and the sizing or scaling of the apparatus and its components can be altered without departing in any way from the scope and spirit of the invention.

Energy Converting Apparatus and System Overview

FIG. 1 shows an exemplary energy converting apparatus system 10 suitable for use with the present invention. Solar energy from the sun 12 impinges upon a collector 14 (alternatively a dish, array of panels, reflector, or concentrator). In one embodiment for use with solar energy collecting, the collector is a mirror or other reflective surface disposed on each panel. A plurality of substantially identical concentrator panels (reflecting elements) 16 encircle a common center to form a concave surface capable of directing light to the energy converting apparatus (ECA) 18. In one embodiment, a groove or slot 20 in the collector 14 facilitates the changing of the angle of the collector relative to a supporting post or pier 22. Energy collected is redirected to the ECA 18 as shown. The concentrator 14 and energy converting apparatus 18 are designed to slew with the sun by using the drive unit 24. In one embodiment, a biaxial drive unit is used. A boom 26 connects the energy converting apparatus with the concentrator. The boom 26 is configured to accommodate the pier 22 as the collector 14 is articulated about its rotational axis.

In other embodiments, the shaped collector can be utilized to concentrate other forms of energy, for example radio or microwave transmissions. Such collectors or dishes are frequently used to collect transmissions from geostationary or orbiting satellites. In such cases, the surface of the concentrator panels is made of a material which reflects the energy waves of interest. In one embodiment, the surface is made of a metallic mesh to reflect microwaves. In one embodiment, the diameter of the collector or dish ranges from about 4.7 m to about 6 m. In another embodiment, the collector or dish is between about 1 m and about 50 m in diameter.

As shown in FIG. 1, a biaxial drive unit (or drive) 24 is configured to move the collector 14 and the energy converting apparatus 18, in accordance with one embodiment. The collector and the energy converting apparatus can rotate through a full 360 degrees. In addition, for compass direction (azimuth), elevation can be adjusted up to about 162 degrees from vertical. In addition, the collector can be parallel to the ground while facing skyward or slant towards the ground during a non-operative or stow mode. Since the systems are typically used for electricity generation, an electronics package 34 or an AC power output 28 are present in some embodiments.

The energy converting apparatus (alternatively referred to in one embodiment as a heat drive or Stirling machine/engine) includes a free piston Stirling engine and various cooling, sensing, heat exchanging, passive balancer, vibration and other subsystems. The energy converting apparatus receives the solar energy and produces useful work or electricity as well as waste heat. The pier or post supports the collector, biaxial drive, and energy converting apparatus. The pier and a portion of the drive assembly that is collinear with one rotational axis of the biaxial drive are also hollow in one embodiment to facilitate the routing of wire or cables. In other embodiments, the energy converting apparatus include solar photovoltaic converters or radio and microwave detectors. The use of a biaxial drive also facilitates advantageous routing of power or fluid delivery cabling. Specifically, the use of an offset drive mechanism allows cabling to be centrally routed through the post or pier used to support the energy converting apparatus.

Figure 2:
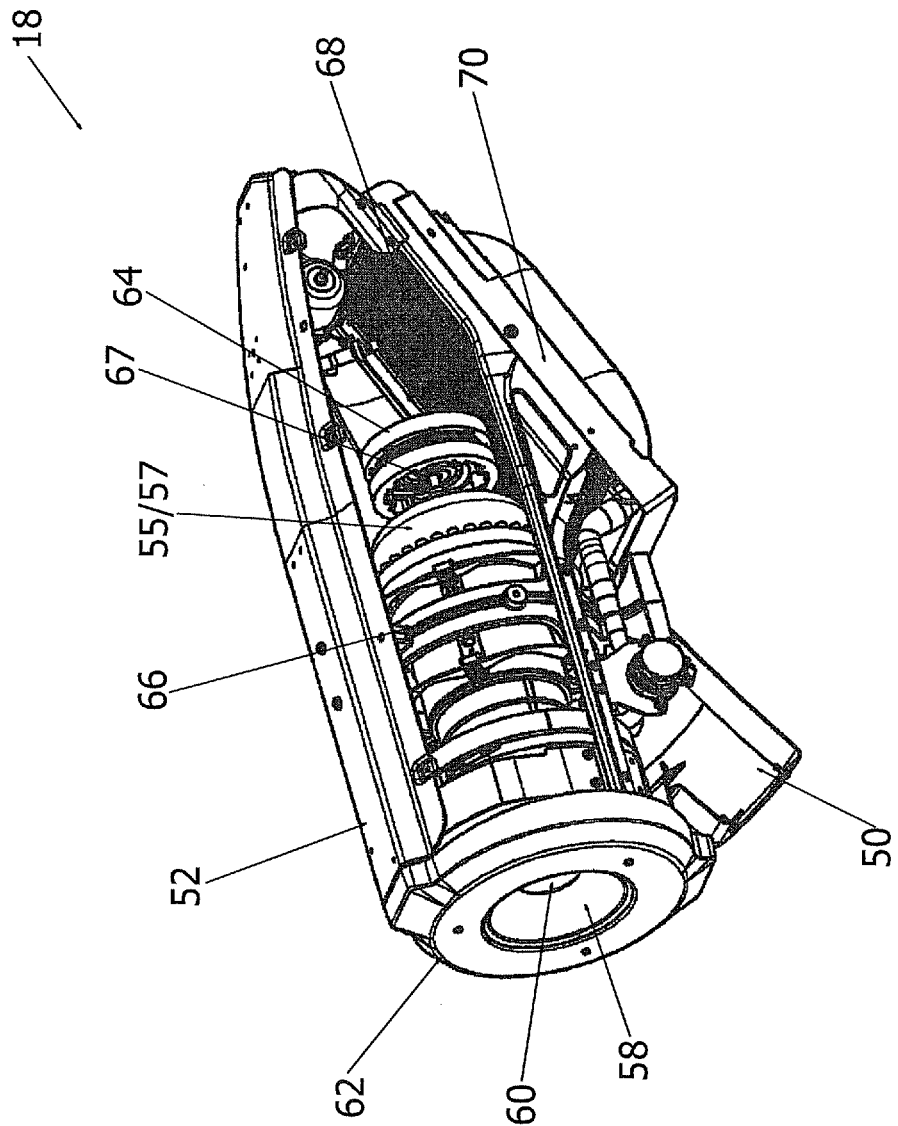
FIG. 2 is an energy converting apparatus accordance with an illustrative embodiment of the invention.
Figure 3:
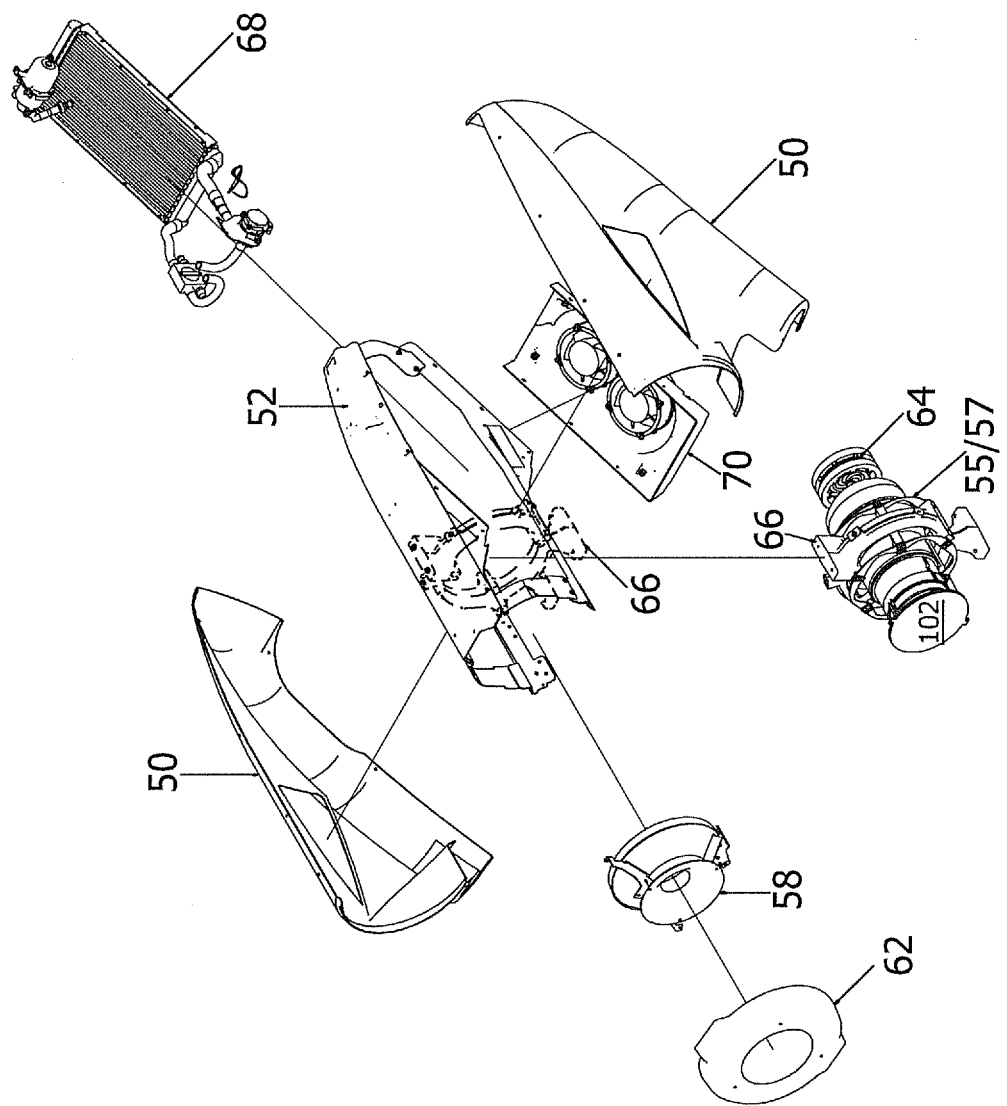
FIG. 3 is an exploded view of an energy converting apparatus.

Since managing heat within energy converting apparatus embodiments is important to viable device operation, it useful to consider the embodiments shown in FIGS. 2 and 3. From these views of the energy converting apparatus 18, the overall apparatus can be divided into a receiver portion and a Stirling engine portion. In one embodiment, the receiver portion includes the faceplate 62, the slew cone 58, and associated components. The engine housing 57 is also shown, and may include several components that form an outer pressure boundary of the Stirling engine 55. In one embodiment, the energy converter is a free piston Stirling engine having an alternator, which generates electricity as the free piston oscillates. A radiator 68 and/or fans 70 can be added to help reduce and/or vent excess heat in the energy converter 18.

As shown, two cover portions 50 connect relative to the top spar or slewplate 52 of the frame such that the top spar of the frame. This design of the frame allows the top spar of the frame to shield the internal Stirling engine portion and receiver components of the energy converting apparatus 18. If a plastic or other covering were used, instead of using a portion of the frame as a heat shield, the plastic could melt or catch fire, thereby resulting in damage to the energy converting apparatus. This melting could occur during a fault condition when the device articulates with the sun. Thus, a beam of concentrated light moving along the spar 52 is prevented from damaging engine components by the additional shielding of the spar.

In one embodiment, the energy converting apparatus includes a passive balancer 64 in communication 67 with the engine housing 57. The balancer reduces vibration caused by the internal components of a Stirling engine. Typically, this balancer 64 is a passive balancer in that it undergoes oscillation in response to other initiating forces within the energy converting apparatus. Balancers such as passive balancers are well known in the art. See, e.g., U.S. Pat. No. 5,895,033. The balancer 64 resonates near the operating frequency and can reduce or partially-balance the fundamental frequency vibration force of the energy converting apparatus or a subsystem or mass disposed therein. In one embodiment, the passive balancer operates to reduce the transmission of vibration load to the ring frame that would otherwise occur because of free piston oscillations.

As shown in FIGS. 2 and 3, the outer portion of the receiver assembly includes a faceplate 62. The receiver face plate protects the rest of the components from solar energy spilling or otherwise impinging on them from imperfect mirrors, auto-commissioning, over-insolation control, failed sensors and other events. As discussed in more detail below, at high level auto-commission or auto-calibration refers to automatic use of a sensor to determine the location to direct the reflected sunlight from a concentrator without a user manually adjusting the concentrator.

Again with respect to the receiver assembly, the faceplate 62 also protects the other components when the dish moves the beam of concentrated solar energy into the aperture or out of the aperture. In addition, the faceplate 62 absorbs and stores the energy before it is emitted by radiation, reflection, conduction, or convection to air or other materials. The receiver faceplate 62 is designed to be easily replaceable in the field in case it becomes damaged from concentrated solar energy. In one embodiment, the faceplate 62 is made out of metal to be impact resistant. In contrast with a ceramic design which could break due to hail or thermal cycling, the faceplate offers many advantages. The faceplate 62 can include a ceramic coating, if cost effective, or other suitable thermal treatment to reduce solar energy absorbance.

FIG. 3 shows an exploded view of an energy converting apparatus 18. In one embodiment, concentrated light passes through the slew cone aperture 60 and impinges on heater head 102, which is in thermal communication with the Stirling engine. In one embodiment, the receiver/engine assembly is carried by a ring frame 66. In some embodiments, the cover 50 and/or slew plate 52 can be secured to the ring frame.

Figure 4:
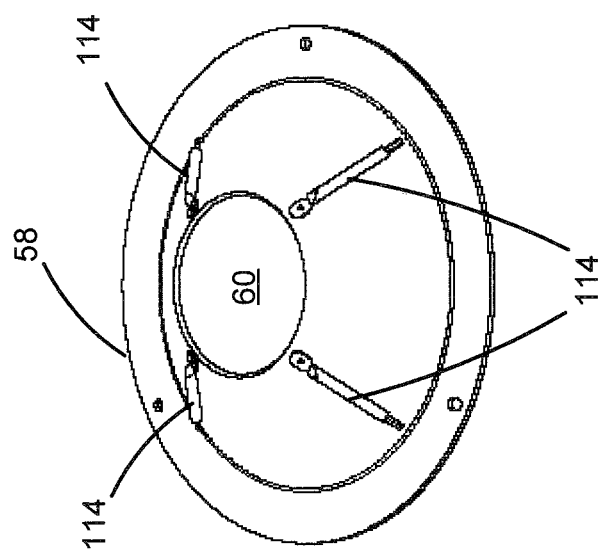
FIG. 4 depicts a schematic diagram of a slew cone and slew cone sensors, in accordance with an illustrative embodiment of the invention.

Referring to FIG. 4, in one embodiment sensors 114 can be used to determine how much energy is spilling or impinging upon the slew cone (or other surfaces of the apparatus). Thus, the relevant sensors 114 collect sensor data, such as temperature data. This sensor data can be used to increase the amount of energy entering the receiver, and thus increase system performance. In one embodiment, the diameter of the slew cone ranges from about 24 mm to about 280 mm. Similarly, the diameter of the aperture 60 ranges from about 80 mm to about 120 mm. In a preferred embodiment, the aperture is about 95 mm+/−0.5 mm.

Alternatively, this sensor data can be relayed to the drive unit to cause light from the concentrator to be distributed around the heater head 102 to reduce the likelihood of overheating the engine or other components of the energy converting apparatus. The sensors 114 used to collect sensor data can be selected from all sensors that can fit within the energy converting apparatus. As an example, suitable sensors can include, but are not limited to, temperature sensors, thermocouples, displacement sensors, accelerometers, radiation sensors, light sensors, or any other sensor.

The receiver assembly can also include one or more sensors 114 in various embodiments to collect data that in turn can be used to enhance device operation or to safeguard the energy converting apparatus or its component elements. In one embodiment, temperature sensors are incorporated in the receiver assembly. In one embodiment, such as that shown in FIG. 4, these sensors are located on the backside (the side not incident with solar energy) of the faceplate and slew cone 58 to protect them from concentrated solar energy and some environmental elements.

In general, to date, receivers have only been of certain types, such as direct illumination receivers (DIR), reflux, or heat pipe receivers. As depicted in the figures, the receiver assembly embodiments described herein do not use a bank of tubes to transfer heat to the engine like DIR's, and are dissimilar to the other receiver designs mentioned above. The material selection and properties of the receiver assembly embodiments and their constituent parts offer many advantages, one of which is that they are more economical than other designs. The novel receiver design is also complimentary with the Stirling engine's linear arrangement of masses and geometric details.

Figure 5:
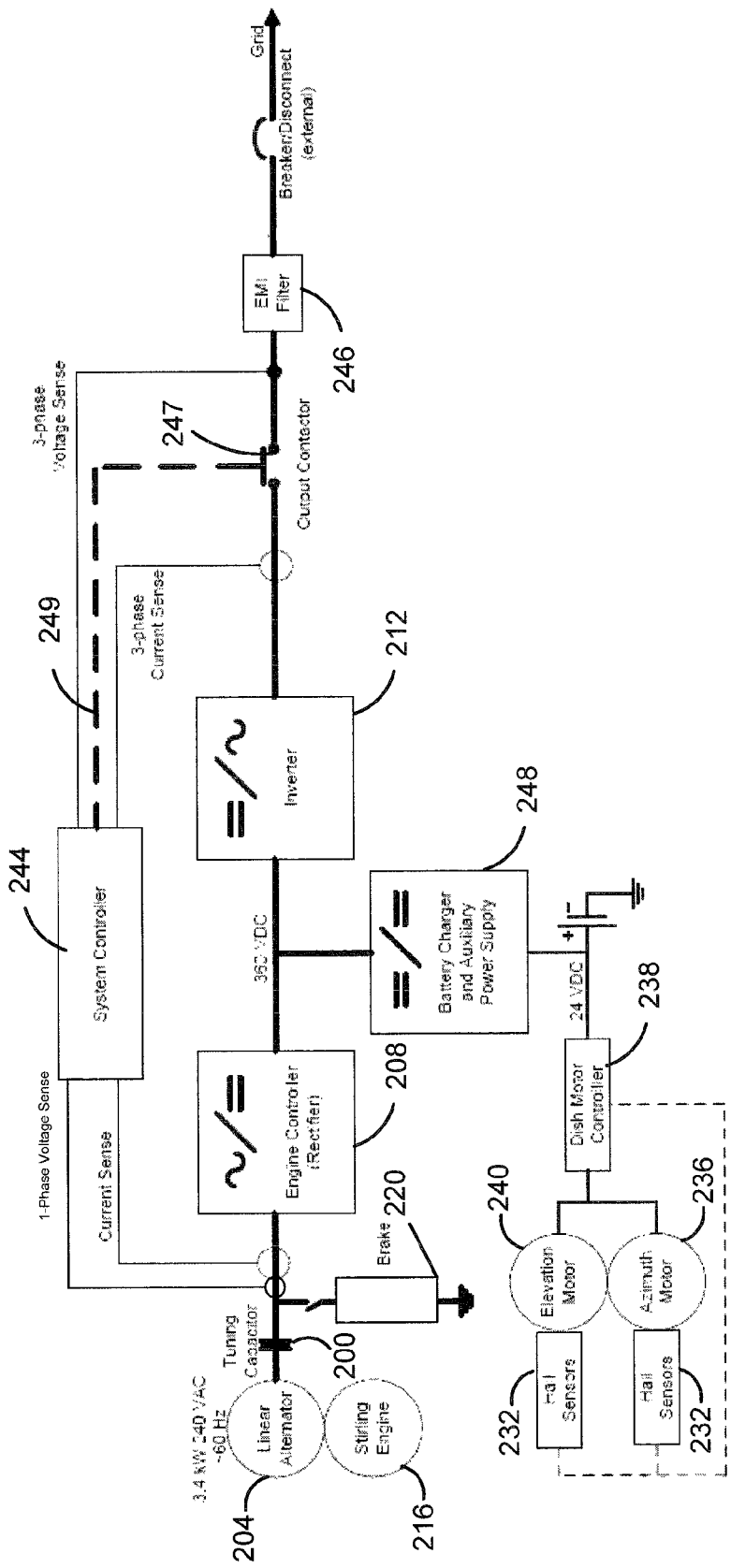
FIG. 5 is an overall bidirectional electric circuit topology in accordance with an illustrative embodiment of the invention.

An electrical system topology is depicted in FIG. 5 for use with various types of energy converting apparatuses that include any type of engine or similar component. The various components or subsystems shown connect by different terminals, ports, or other electrical connection or coupling points. As shown, a system that allows the multidirectional flow of electricity from a linear alternator to the electrical power grid and battery charger is shown. Referring to FIG. 5, according to one embodiment of the invention, the electrical topology includes a tuning capacitor 200 in series with the engine's alternator output 204, followed by a switching rectifier 208, and an inverter 212. In a traditional system, the tuning capacitor 200 is eliminated when a switching rectifier 208 is used. Alternatively, in traditional systems, the tuning capacitor 200 remains present, but the output of the generator is then coupled directly to the load. In contrast, in the present invention, the tuning capacitor is for impedance matching, or correcting the power's phase angle from the inductance of the alternator winding. This could be done by the active rectifier alone, but as discussed here, there are benefits to using a tuning capacitor. In one embodiment, the stall circuit includes a resistor paired with a capacitor. The capacitor can be the tuning capacitor or an additional capacitor in a given embodiment.

One advantageous feature of the present topology is that the use of the switching rectifier 208 allows better control of the engine 216 through direct control of the stroke of the linear alternator, versus direct coupling to the load. The presence of the tuning capacitor 200 allows the engine 216 to be stalled independently of the switching rectifier 208. In one embodiment, stalling refers to stopping the engine. Stalling can also refer to a state during which the engine continues to run at lower piston amplitude and power relative to the continuous rating of the stall circuit. In one embodiment, the engine can continue in this state or eventually come to a stop.

Should the rectifier fail, this independence will allow the engine to be stalled without damage to it. The capacitor 200 is used to cancel the inductive reactance of the alternator's stator winding, so that power can be passed from the engine 216 even if the switching rectifier fails. Without this capacitance, or a working switching rectifier 208 to correct the power factor of the inductive alternator 204, the engine 216 would not be able to pass power and it would over-stroke.

One embodiment of the invention provides for over-stroke protection using a combination of electrical components as part of an electrical topology. Over-stroke protection is provided to prevent the engine from over-stroking when the energy produced by the engine/energy converting apparatus exceeds that taken by the load. According to one embodiment, the over-stroke protection or stall circuit is situated between the engine and switching rectifier, identified in FIG. 5 as stall circuit or brake 220. The over-stroke protection, in one embodiment, is implemented as an AC stall circuit prior to the rectifier, versus a DC stall circuit on the output of the rectifier. The advantage of this implementation is that the stall circuit will function and protect the engine 216 even if the rectifier 208 or its control circuitry fails. Additional details relating to stall circuit embodiments are shown in FIGS. 6A-7B.

With respect to use of a brake in the overall electrical topology, in one embodiment the brake is a load that does not stall the engine, but draws power temporarily during short interruptions, such as a temporary grid outage. Thus, the benefits of the brake are to protect the engine under certain atypical events. In one embodiment, in lieu of a brake, a resistive load or a resistor paired with a capacitor stalls the engine. In contrast, a brake would be able to handle the max output power of the engine continuously without failure. The brake would radiate waste heat in the process. As a non-limiting example, the continuous rating of a brake for a 3.4 kW energy converting apparatus would be about 3.4 kW. In contrast, the continuous power rating of a corresponding stall circuit for a 3.4 kW engine would be about 100 W since the engine is stalled and power production ceases, or is reduced to a level below the continuous rating.

According to one embodiment, the stall circuit 220 draws more energy than the engine is able to produce, effectively clamping the engine's piston motion. Stalling the engine is preferred to allowing it to continue running, dissipating power into a dummy load, for two reasons. First, allowing the engine to run requires a load element rated to the continuous power rating of the engine. This element is physically large, requires cooling because it must dissipate about 3 kW of heat, and adds additional cost. Second, for systems equipped with thermal storage, it is preferred not to waste energy by allowing the engine to run into a dummy load. By stalling the engine, energy can be stored in thermal form that can be used to fuel the engine at a more beneficial time, i.e., producing power when the sun is not shining or resuming power production when a failed grid returns to compliance.

When the engine experiences a stall load (in excess of the engine's power production) the piston amplitude drops rapidly. However, the moving mass of the balancer, which is tuned to a higher frequency (which can range from about 68 Hz to about 71 Hz) than the natural frequency of the engine (ranging from about 60 Hz to about 63 Hz), will begin to drive the piston at the balancer's higher resonant frequency. When stored displacer energy is dissipated, the engine will then transition to a frequency closer to the alternator's natural frequency (about 58 Hz). The result of these frequency changes is that the power produced is no longer tuned to the resonant frequency or another acceptable frequency of the tuning capacitor, and the engine is unable to pass power to the load, resulting in over-stroke and engine damage.

One embodiment's approach is to stall the engine and prevent over-stroke by switching to a reactive stall load that is tuned relative to the center point or band of certain frequencies, (such as the various natural frequencies of the mechanical components (balancer, displacer, alternator), and has adequate bandwidth to allow power to be passed from the engine as it transitions through the various frequencies when stalling. In one embodiment, the stall circuit's resonance frequency is designed to be approximately 62 Hz. With sufficient bandwidth, the circuit will effectively stall an engine with a balancer natural frequency of about 71 Hz, an alternator natural frequency of about 58 Hz, and a nominal engine operating frequency of about 63 Hz (and operating range between about 59 Hz and about 64 Hz). In one embodiment, the bandwidth ranges from about 50 Hz to about 80 Hz. The frequencies discussed herein are illustrative and will vary for different circuit elements and engine configurations.

During normal engine operation at about 63 Hz, a 200 uF tuning capacitor is used in series with the alternator output to effectively cancel the alternator inductance (which is about 28 mH) and allow power flow at near unity power factor into the rectifier. When activated, the stall circuit changes the tuning capacitance to about 280 uF and loads the engine with about 3 Ohms. This combination of stall circuit components has adequate bandwidth to stall the engine as it transitions from its operating frequency to be driven by the balancer nearer to its natural frequency, and then again by the alternator nearer to its natural frequency.

When stalling, the tuning capacitance is changed to one that meets the requirements of the stall circuit. According to embodiments of the invention, this can be done in many ways when stalling, i.e., by 1) replacing the tuning capacitor with another capacitor, 2) by adding a second capacitor in series or in parallel with the tuning capacitor, or 3) by removing a capacitor that is in series or parallel with the tuning capacitor during normal operation. Adding two capacitors in parallel raises the effective capacitance. Adding two capacitors in series lowers the effective capacitance. Both the second and third approaches make use of the tuning capacitor in the stall circuit, and thus avoid the cost and physical size of dedicated 'run' and 'stall' capacitors.

It is also possible to operate the engine without a tuning capacitor, using the rectifier to simulate capacitance that cancels the inductance of the alternator. In this embodiment, a stall circuit may be used with dedicated capacitance for stalling the engine.

According to an embodiment of the invention, a system controller is operatively connected to the system topology in order to drive the operational states of the energy converting apparatus. Referring again to FIG. 5, although the system controller 244 of the embodiment depicted in FIG. 5 is connected in parallel to the rectifier 208, power supply 248 and inverter 212, one skilled in the art should recognize that the system controller 244 (or multiple system controllers as may be used in one embodiment) may be located anywhere in the topology such that sufficient connectivity with each controllable element is permitted.

In one embodiment, the system controller is a processor such as a microprocessor. An exemplary processor or microprocessor (whether one or multiple are used) suitable for performing the control features described here is the TMS320F2808PZA offered by Texas Instruments. In one embodiment, the system controller 244 includes a sensor interface board (SIB) with one or more processors on the board or otherwise distributed throughout the system. The system controller 244 drawing can be a virtual representation of the control system. In one embodiment, system control codes, instructions or software may reside in and be executed from one or more microprocessors in the system.

In one embodiment, in addition to reading sensors (SIB functions) the processor in the SIB (Texas Instruments TMS320F2808PZA) executes system control functions. When it requires one of the other system elements (dish motor controller, rectifier, or inverter) to do something, based on a sensor change or other control system requirement, it sends a command to the relevant system element. In one embodiment, the command, data or instruction is sent over the internal CAN communication bus.

As shown in FIG. 5, the system also includes an output contactor in electrical communication with the grid and a generator. An Electromotive Interference (EMI) filter 246 can also be used in one embodiment to clean up the inverter's output power so that it is compliant with utility and certification requirements. In one embodiment, the purpose of the output contactor 247 is to isolate the inverter output from the grid. Once the contactor 247 is closed, power flows backwards from the grid through the inverter and can be used to move the dish around, bump the engine, power pumps, fans, etc. In one embodiment, the output contactor is a discrete device that is mounted to the inverter. The system controller includes one or more current sense lines as shown. In addition, the controller 244 can also include a control line 249 by which the controller 244 regulates the contactor 247. In one embodiment, the inverter is configured with ground isolation on one port, as ground-referencing both sides of the inverter will result in a short-circuit and damage when the inverter is operated.

In one embodiment, an output contactor's coil 247 is directly controlled by a power regulating component (such as a switching transistor) in the inverter. However, the power regulating component typically responds to a command from the inverter's controls. That command may originate on an inverter control board, or originate from the controller 244 such as the sensor interface board's (SIB) processor (which executes system control functions in one embodiment). In one embodiment, the controller 244 sends a serial communication message or other instruction to the inverter control board which provides a digital signal to a power transistor on the inverter's power board. The output of the power transistor controls the coil that opens or closes the output contactor.

Figure 6A:
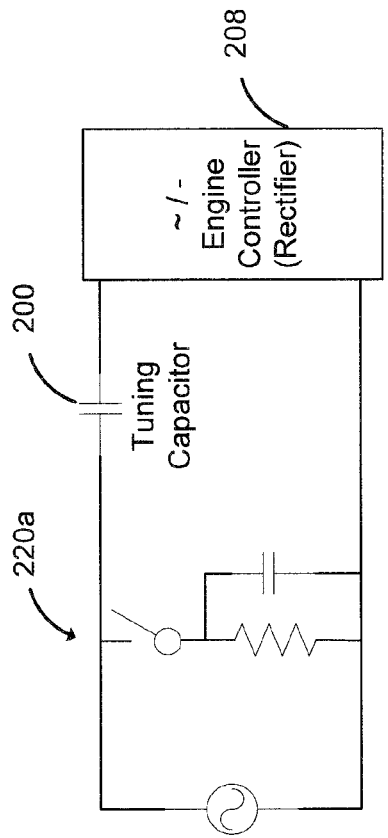
FIGS. 6A-6F depicts certain embodiments of a stall circuit, in accordance with an illustrative embodiment of the invention.
Figure 6B:
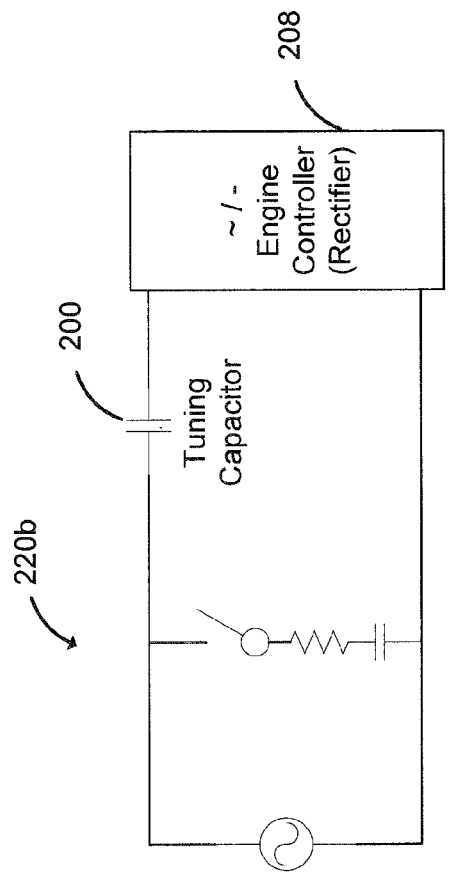
Figure 6C:
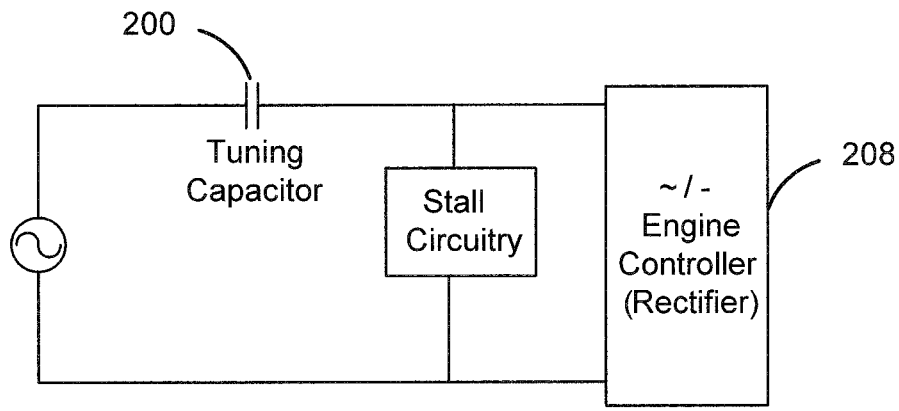
Figure 6D:
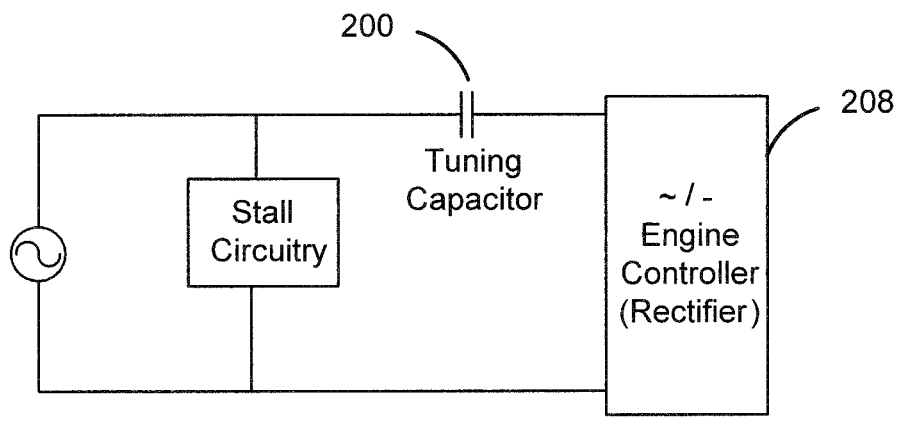
Figure 6E:
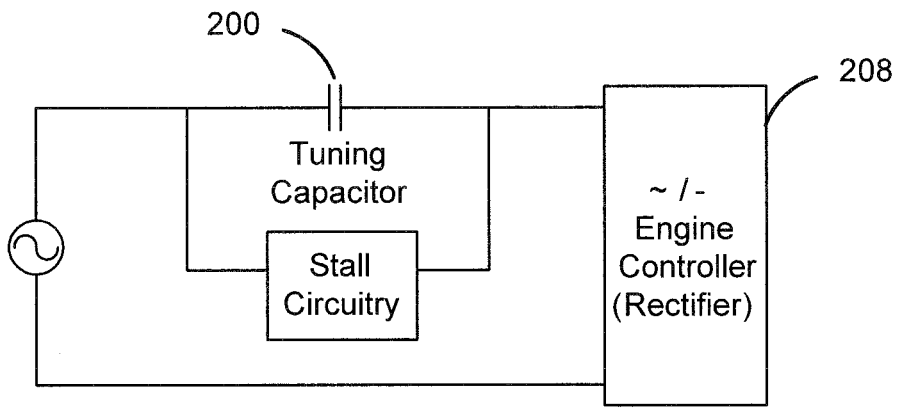
Figure 6F:
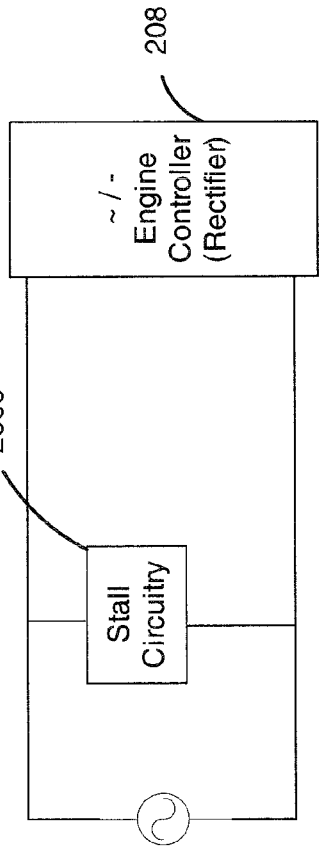

FIGS. 6A-6F illustrate exemplary embodiments of the stall circuit as described herein, in accordance with illustrative embodiments of the present invention. For example, in some embodiments the stall circuit 220a, 220b is either a series (FIG. 6B) or parallel (FIG. 6A) connected resistor capacitor pair. Similarly, in FIGS. 6C-6F other configurations of general stall circuitry are depicted. In FIG. 6F, a system with stall circuitry 220c that does not use a tuning capacitor is shown.

As resistance is increased the available frequency bandwidth of the stall circuit increases. In this context, when the energy converting apparatus is operating the engine produces output power over a range of operating frequencies. In turn, the passive balancer operates over a range of operating frequencies. Further still, the alternator also operates over a range of frequencies. When the engine enters a stall states, these (and other) energy converting apparatus undergo a change in frequency as they slow down and stop moving or move within an acceptable range. Thus, as stalling begins initially the engine frequency is dominant, next as the engine slows, the passive balancer frequency may be the dominant frequency, finally as the balancer slows the linear alternator may be the dominant frequency. Accordingly, these mechanical frequencies are correlated with the current and voltages produced by the energy converting apparatus. As a result, when the stall circuit element is selected the overall frequency bandwidth of the stall circuit should be sized such that it can accommodate the different frequencies associated with different moving components of the energy converting apparatus.

Figure 7A:
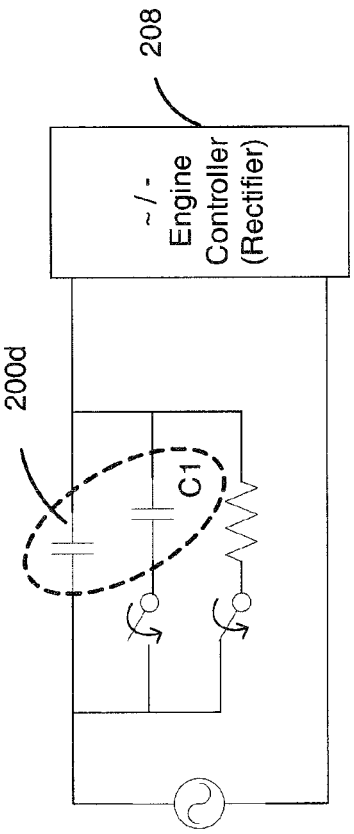
FIG. 7A depicts an additional embodiment of a stall circuit, in accordance with an illustrative embodiment of the invention.

FIG. 7A depicts a parallel connected pair of capacitors 200d and a parallel connected resistor. This is a specific embodiment of the general configuration depicted in FIG. 6E. In stall mode, the parallel capacitor ($C_1$) is disconnected from the tuning capacitor 200, reducing the capacitance used during stalling and the resistor is connected in parallel. Alternatively, the parallel capacitor ($C_1$) may be connected in parallel with the tuning capacitor so that the effective capacitance is increased when stalling. An advantage of an embodiment that uses the tuning capacitor during stalling is avoiding the use of dedicated stall and run capacitors. This reduces size and cost of the components.

Embodiments of the invention also provide for the prevention and control of over-insolation, i.e., an excess of solar radiation energy received on a given surface area in a given time. For example, if during sun tracking, heater heat temperature exceeds a predetermined maximum, or an electronics heat sink temperature reaches a predetermined maximum, over-insolation tracking can be initiated. According to one embodiment, the energy converting apparatus' dish is sized so that the system can produce about 3 $kW_e$ when the solar insolation is about 850 $W/m^2$. As the system is not sized to produce more than about 3 $kW_e$ when the insolation is greater than 850 $W/m^2$, solar energy must be rejected or the system will overheat and/or over-stroke.

Conventional approaches attempting to prevent over-insolation involve mechanical shading of a portion of the dish, mechanically blocking a portion of the focused light before it enters the cavity receiver, and venting heat from the cavity receiver via fans and ventilation pathways.

Embodiments of the invention solve the over-insolation problem with an approach that purposefully misaligns the dish with the sun in a controlled fashion so that a portion of the concentrated beam 'spills' out of the receiver aperture. The misalignment of the dish forces a portion of the beam to intersect with the slew-cone instead of entering the cavity receiver. As the energy content of the spilled light is sufficient to damage the slew-cone, the spilled light beam is rotated around the circumference of the aperture opening so that the slew-cone is able to cool down before the spilled light makes another pass.

According to one embodiment, the rotational speed of the solar energy beam is between about 0 to about 180 revolutions per minute (rpm). More preferably, the rational speed is between about 1 to about 30 rpm. In one embodiment, a minimum rotational speed of about 11 rpm prevents the slew-cone from being damaged. However, it will be appreciated that a variety of rotational speeds may be suitable, depending on the particular configuration of the system and the ambient conditions. The degree of spillage (or, misalignment) determines how much heat is rejected by this method.

Figure 8:
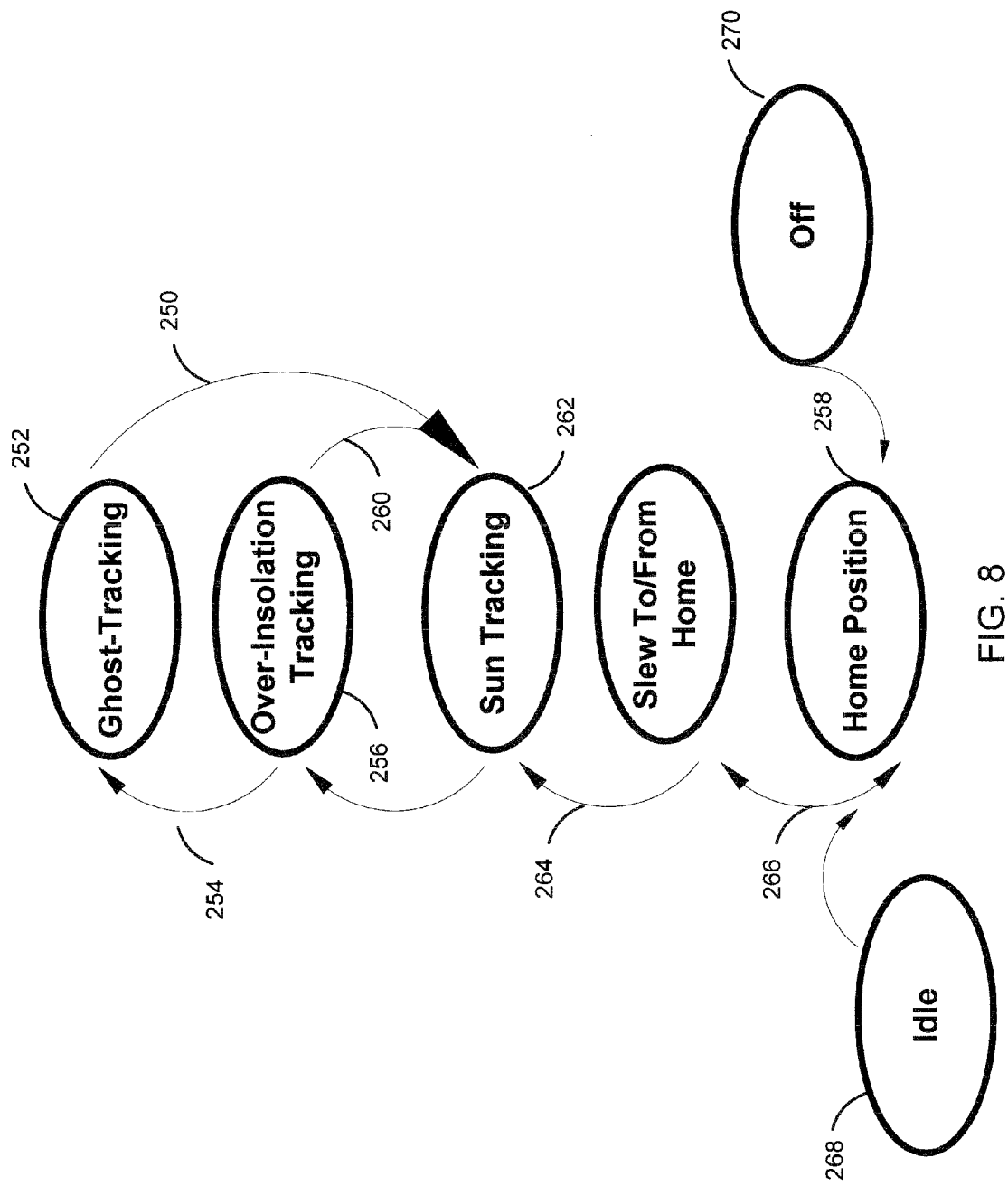
FIG. 8 is a state diagram which depicts various operational states of a device embodiment that can be regulated using the method and control system embodiments described herein, in accordance with an illustrative embodiment of the invention.

Should circular-tracking be insufficient to adequately lower temperatures, the dish may be elevated such that the focused sun spot is above the heat drive until temperatures are acceptable to resume operation. Tracking the sun with this elevation offset (e.g., by 15 degrees) is referred to as 'ghost-tracking' This is one of the operational states shown in FIG. 8. Ghost tracking 252 can transition 250 to sun tracking 262 if, for example, the heater head temperature and electronics heat sink temperatures meet acceptable operating temperatures. Also, over-insolation tracking 256 may be configured such that it transitions 254 to ghost tracking 252 in some embodiments, such as if over-insolation tracking fails to reduce engine temperatures to acceptable levels, or over-insolation tracking 256 may transition 260 to sun tracking 262 if the engine is of acceptable temperature levels. As shown in FIG. 8 an idle state 268 and an off state 270 are also shown. While in the off state, the system is completely de-energized, and must be manually switched on before it will respond to commands from the communication bus. In the idle state, the system is in a low-power consumption mode. In this state, it maintains charge of the batteries and is able to respond to commands.

Referring back to FIG. 5, in one embodiment, to determine the position of the collector, the rotation of the motor may be measured. In one embodiment of the invention, Hall sensors 232 are included in brushless DC motors to provide feedback to the controls for commutation (switching) of the motor power. The controls rely on hall sensor 232 feedback to determine the timing of energy pulses to produce rotation in the motor (shown in connection with the Azimuth 236 and Elevation 240 motors of FIG. 5).

In traditional motor control systems, encoders are used to provide pulse-count feedback to the control circuit for accurate position information. An encoder provides a fixed number of pulses per revolution of the motor shaft. These pulses are resolved by the control circuit to determine precise rotational position information. Encoders are typically used, rather than Hall sensor feedback, because the number of Hall sensor pulses per revolution (related to the number of poles in the motor) is far less than the number provided by an encoder. The encoder provides greater resolution, and thus more accurate position feedback than the Hall Effect sensors.

Embodiments of the energy converting apparatus of the present invention use Hall sensor feedback for dual purposes; both for commutation of the motor power and for dish position feedback. This is possible because of the large gear ratio of the bi-axial gear drive that connects the DC motor to the dish. According to one embodiment, the gear ratio is on the order of 40,000:1.

The gear ratio can be greater than or equal about 200:1. In one embodiment, the gear ratio ranges from about 600:1 to about 35,000:1. In one embodiment, the gear ratio is greater than 35,000:1. The large gear ratio causes the relatively small resolution of the motor Hall sensors to be more than adequate for providing accurate position information of the dish position. The use of the Hall sensor feedback therefore eliminates the need for an encoder. Elimination of encoders, one for each axis, reduces system cost and control complexity, while improving overall reliability.

According to one embodiment, the energy converting apparatus' control system uses 24V DC power for powering the dish positioning motors. In a traditional motor control system, the 24V is created from rectified AC grid power or energy converting apparatus' engine power which is buck-converted from about 360 V DC to 24 V DC. However, in the event of a grid power outage, the power to the motor is lost and the system is unable to move the dish off the sun, resulting in hardware damage.

Embodiments of the invention provide redundant 24V power through a 24V battery connected to the bus. In the event of a grid power outage, the 24V battery provides enough power for the motors to move the dish to the downward-pointing stow position. The batteries are constantly charged during normal operation by energy from the Stirling engine or grid.

Power is provided to the grid using an inverter with an active rectifier. According to one embodiment, the control topology of the energy converting apparatus uses an active rectifier to regulate engine stroke where the output of the rectifier (DC) provides current to an inverter which regulates the DC bus and then inverts the DC to supply the output AC to the grid. The rectifier's primary purpose is to regulate the stroke of the engine in a way that optimizes total system performance. The purpose of the inverter is to produce usable AC power while regulating voltage on the DC bus. If the DC bus voltage level rises, the inverter converts more DC power to AC, constraining the rise of the DC bus voltage level. As the DC bus voltage level decreases, the inverter produces less AC power to keep it from dropping too low, and/or to raise it. If the DC bus voltage level rises too much, the voltage will exceed the safe operating limits of the solid-state devices. If it drops too much, the inverter will not be able to produce power that meets the customer or utility requirements. The rectifier and inverter have independent objectives, but work in harmony to maintain operational stability.

According to an embodiment of the invention, a system controller is operatively connected to the system topology in order to drive the operational states of the energy converting apparatus. Referring again to FIG. 5, although the system controller 244 of the embodiment depicted in FIG. 5 is connected in parallel to the rectifier 208, power supply 248 and inverter 212, one skilled in the art should recognize that the system controller 244 or multiple controllers may be located anywhere in the topology such that sufficient connectivity with the individual system components and controllers exists to provide the necessary level of control.

In general, the control system (such as the one or more programmed processors described herein) can detect changes or values associated with various system parameters (or first derivatives thereof with respect to time) and based on the changes or detected values (feedback) move the concentrator, move the energy converting apparatus, or change a mechanical parameter, an electrical parameter, or another parameter associated with the system or its subsystems to improve or maintain operation or prevent a fault state (or recover from such a state).

In the present embodiment, several processors are distributed throughout the system. For instance, one controls the rectifier, another controls the inverter, etc. System control functions can be programmed into one or more of these existing processors, depending on how much excess capacity is available for a given processor. The processors communicate to one another via an internal communication bus. Therefore, system control functions may be executed by any processor in the system programmed with those functions, with control over any other processor in the system via commands sent over the communication bus. A plurality of operational states is described below in accordance with an embodiment of the invention. Additional details relating to exemplary transitions and operating cycles for various states are also shown in FIG. 8.

In operation, the system controller, according to one embodiment, operates in two different modes: Autonomous Mode and Manual Mode. In the Autonomous Mode, the system uses a GPS time clock to trigger operations throughout the course of a day: starting at sunrise (pre-determined sun elevation angle), generating power as insolation allows, stowing at sunset, and repeat of the cycle each day of the year. In Manual Mode, the system is controlled via commands from a user interface.

Referring to FIG. 8, the controller proceeds through a number of states. In one embodiment, when in the Off state, the system is completely de-energized, with the system disconnected from the grid and the 24V system battery. When energy is restored, the system transitions from the Off state to the Idle state. In the idle state, the system is in a low-power consumption mode. In this state, it maintains charge of the batteries and is able to respond to commands.

The system can stay in the Idle state until receiving a manual start command, or an automatically generated start command because the calculated sun position has reached the 'sunrise' angle. The sunrise angle is the elevation angle of the sun at a particular time of day. The system always knows the sun's position relative to the system throughout the 24-hour period, including the night. As an example, 84 degrees sun elevation may correspond to 7:30 a.m. in the morning. A user defined angle at a particular time a year, such as 84 degrees, can specify the time the system will automatically start and begin tracking the sun. This information is stored in local memory.

When a start command is received, the system conducts a self-test and home-sensor calibration routine for determining actual position of the dish. When these routines are complete, the dish enters the Slew-to-sun state 264. The initialization state is executed every time the Autonomous Mode is selected and subsequently after a user-configurable interval. In this state, the system resets the dish position counters by traversing over certain Hall effect proximity sensors (always in the same direction) and setting the counters to a pre-determined value.

In one embodiment, the system controller includes a counter for each axis, azimuth and elevation. These counters maintain a count representing the position of the dish in each axis. During initialization, the dish is moved to a known position. This is typically done by rotating the dish in each axis until a fixed magnet on one surface triggers a fixed Hall or reed switch on the opposed surface to designate a positive stop. Once the switch is triggered, the dish position is precisely known and the counter for that axis is set to zero, or set with a pre-determined count. As the dish moves from that position, the Hall sensor generates pulses from the motor on that axis that are used to increment or decrement the counter, depending on whether the motor is being rotated clockwise or counterclockwise. With the gear ratio of the gearbox known, a count of the motor rotation can be translated to degrees of rotation and therefore the dish position precisely known. In the initialization state, the system clock may be updated to Greenwich Mean Time using the GPS. Calibration of the open-loop dish positioning algorithm is performed on a pre-determined calendar time interval, or based on sensor feedback that indicates the dish support structure has moved, due to earth settling or other causes.

The Stowed state is reached following system initialization, or after the 'Slew to Stow' State 266 initiated by a sunset or a fault event. The stow state can be the home state or home position 258. The Slew-to-Sun state 264 may be initiated manually, or autonomously as the sun elevation reaches the 'sunrise' setting. Motors perform a coordinated two-axis transition, with the combined rate of motion never less than the specified minimum slew rate for protection of the heat drive surfaces when slewing across those surfaces. This state can occur before entering the sun tracking state 262.

A 'no-fly' zone exists around the heat drive, to protect the engine surfaces from concentrated insolation. The concentrated sunlight reaches the receiver aperture by slewing across surfaces specifically designed to withstand the highly concentrated heat. During normal operation, slewing on and off the sun is performed across these surfaces. However, other surfaces may be exposed to the concentrated light when slewing during certain fault modes.

Slew-to-Stow 266 is initiated by the elevation angle value set for "sunset" being attained, by manual command, or by a fault handling routine. This state can occur before entering the home position state 258. Slewing on and off the heat drive may also be accomplished from the bottom side of the aperture if surfaces are designed for the insolation. For installations near the equator, where the sun may pass directly above the dish, this capability is required, as slewing down is the only option for removing the heat drive from the sun. This follows because, when the sun is directly overhead, azimuth movements are not effective in moving the heat drive off the sun.

As in the case of slewing onto the sun, slewing off the sun is also accomplished by observing the no-fly zones. A nearly pure 'elevation up' transition will position the focal point up relative to the slew plate such that it reaches a benign location above the engine. From there, an azimuth transition will reposition the focal point beyond the heat drive shrouding, where a combined Azimuth/Elevation (AZ/EL) spatial transition can complete the slew to stow motion.

Commissioning is used to accurately position the dish using internal sun-position algorithms. Commissioning allows the system to adjust internally-generated algorithm sun position coordinates for errors specific to each system, such as the number of degrees from vertical the post is installed.

Commissioning requires the dish's spot focus be guided into the receiver aperture where sun sensor (or, 'flux' sensor) feedback can be used to determine any error between calculated and actual sun position. The error is the result of system-specific characteristics, such as structure installation orientation error from vertical or true north. This guidance may be performed manually, with a joystick-type control. Alternatively, an automatic commissioning algorithm may be employed that traverses the heat drive at high speed along a position pattern, allowing feedback from the sun sensors to determine the actual position of the sun. Heat readings from opposed pairs of sensors are used to adjust the dish position to find the precise location of the sun. An alternative embodiment uses feedback from heater head temperature sensors to determine the position of the sun. Additional commissioning or calibrating features are discussed below with respect to FIGS. 15A-15C.

Once the actual position of the sun is determined with sensor feedback, the system tracks 262 (FIG. 8) the sun using closed-loop feedback from the sensors to correct the open-loop sun coordinates provided by internal algorithms. As the system tracks the sun throughout the day, data is taken over the sun's full arc of travel in the sky. The data taken depict the relationship between the computed sun position from the algorithms and actual sun position data as confirmed by the sun sensors. The difference between the two coordinate pairs is used to 'train' the internal algorithms to provide accurate open-loop position coordinates.

Closed-loop control refers to control using feedback. Typically, a measured (feedback) value is compared to a reference value (which may be a previous instance of the measured value). An error quantity is derived from the difference between the two values, and action is taken based on the magnitude of the error quantity. After the action completes, another measured value is taken and 'fed back' to be compared again to the reference. A new error quantity is derived and the cycle repeats. Open-loop control does not involve feedback. Instead, action is taken based on inputs, with expectation that desired results are adequate without the feedback check step.

With respect to dish control, in one embodiment a combination of both methods are used. After calibration, the dish is first positioned open-loop, using algorithms that calculate precisely where the dish should be pointed. Once the dish is positioned open-loop, feedback from flux sensors is used to close the loop and provide feedback. Data from the sensors is monitored, and minute dish movements made to balance the sensor temperatures. These small changes to dish position based on closed-loop feedback allow even more precise dish positioning than achieved by open-loop positioning alone. And, actual feedback from the flux sensors provides added security through detection of fault conditions. For instance, if the system positions the dish open-loop, but the flux sensor feedback indicates a larger temperature difference between sensors than expected, an error has occurred with the open-loop positioning and a fault can be declared before hardware is damaged.

Once the system is 'trained' via this commissioning process, the system is able to accurately position the dish relative to the sun, without closed-loop sun sensors. However, during normal tracking, the sun sensors are used for fine-tuning of the open-loop position, and for error-checking and initiation of engine bumping actions. Engine bumping action refers to use of the electronics to power a non-operating engine, or 'motor' the piston by applying AC power to the linear alternator. Moving the piston in this way, in response to sun sensor detection of insolation, helps circulate the working fluid in the engine (Helium, in this embodiment). This serves to distribute heat, which diminishes hot spots that can thermally fatigue the engine and limit life. Motoring the engine also helps it get started, once enough thermal potential is present to start the Stirling cycle.

Once commissioning is complete (as described above), the open-loop algorithm is 'trained' to accurately position the dish, even with local installation and system error contributions. These error parameters are specific to each installed system and are used to correct the theoretical azimuth and elevation coordinates calculated by system and associated processing elements for the imperfections of each system and its installation. For example, one of the parameters corrects for the error between true north, and the direction the system is installed. If the system is installed pointing exactly north, this parameter will be zero. However, systems usually have some positional error relative to true north that needs to be accommodated in the open-loop coordinates. If adjustments are not made, the dish will not be accurately positioned.

Once the system completes a Slew-to-Sun transition (moving the dish from the home or stowed position to a position where sunlight is concentrated on the cavity receiver aperture), and after commissioning, coordinated motor movements keep the sun focused on the receiver aperture. Motor-counter coordinates are derived from internal algorithms as described below. As shown in FIG. 8, the tracking state can include, but is not limited to ghost-tracking 252, over-insolation tracking 256, and sun tracking 262.

An alternative embodiment uses temperature sensors on or near the heater head to provide feedback to the positioning system. By moving the dish in direct response to heater head temperature sensor feedback, dish position can be varied to 'hunt' for the position that provides the most energy into the heater head. The closer the sensors are to the actual heater head, the faster the thermal response to incoming insolation.

However, sensor proximity to the heater head is directly correlated to sensor temperature. And, sensor exposure to extremely hot temperatures can limit their life or increase their cost.

Positioning the sensors further away from the heater head can reduce their cost and increase their life, but a time lag is introduced between the actual heater head temperature and the sensor temperature. If this lag is quantified, it can be accommodated for by the algorithms. An alternative that addresses the time lag is to sense the rate of change (derivative) of temperature, as well as absolute temperature. While absolute temperature moves slowly, relative to the time lag, the derivative responds much more quickly.

Manual control is initiated from remote software or hardware via the User/Maintenance port in the control/connection bay. Complete control of the system is possible from the Manual Control State, thus precautions are typically observed. Each of the states defined above are implemented, according to one embodiment, through the following functions and logic definitions. The control of the engine begins with the engine start sequence when the Tracking State is reached.

As concentrated sunlight heats the engine's heater head, temperature is monitored via two thermocouples or other sensors. When the heater head reaches sufficient temperature, a bump pulse is produced by the rectifier on command from the control system. A bump pulse is a pulse, or pulse train of AC power from the rectifier to the linear alternator of the engine. Power applied to the linear alternator in this fashion moves the piston that is mechanically coupled to the permanent magnet in the alternator. The piston motion induces movement in the displacer via a pressure wave in the working fluid of the engine. In this way, bump pulses circulate the working fluid of the engine. This helps to distribute concentrated heat in the heater head due to solar insolation, prior to the engine starting. Bump pulses also serve to start the engine once there is enough thermal potential present to sustain the Stirling cycle. This cycle continues until the engine starts.

Once the engine is started, one element of control engine control relates to engine output monitoring. In one embodiment, this is accomplished by active control of the engine's AC output. Engine stroke is inversely correlated to head temperature for any fixed amount of energy into the heater head. Since engine stroke is directly correlated to the amplitude of the voltage at the rectifier input (output voltage is directly related to alternator mover velocity and motor constant—a proportionality constant that indicates a generator's ability to transform mechanical energy into electrical energy), by varying voltage amplitude at the input to the rectifier via active control of the rectifier, heater head temperature is controlled.

Safe engine operation is monitored and assured by 1) maintaining stroke to within a pre-determined safe operating limit, 2) maintaining heater head temperature to within a pre-determined safe operating maximum, and 3) monitoring the engine's cooling system via water jacket temperature feedback to ensure it is within a pre-determined safe operating maximum.

Once the dish is positioned to align the engine with the sun, heater head temperatures and sun-sensor feedback are used to determine when to bump and how to motor the engine. Since it is possible for there to be insufficient heat for motor running, but sufficient heat to damage the heater head, the engine must be electrically driven to circulate the working fluid in the engine (helium) to distribute heat under certain conditions.

Engine shutdown begins when the engine's heater head is removed from the heat source. As the engine continues to run, heat is drawn out of the heater head. The heater head temperature drops. Along with the temperature drop, piston amplitude drops until the engine eventually stops.

The control of energy to the grid is implemented through the use of electrical topology. Referring again to FIG. 5, the inverter's primary functions are to regulate the DC bus and produce quality power into the grid. The DC bus may be regulated by the inverter at a level necessary to produce three-phase AC power (360 V DC), or other desired output voltages. Should the grid fail, or its quality deteriorate, the inverter's protective relay functions must detect this and turn off the inverter. Once the inverter ceases to produce power, if the rectifier is still producing power, the DC bus level can rise quickly beyond desired limits. Therefore, once the inverter ceases to produce power, the rectifier must also cease to flow power into the DC bus. It is turned off, and its input, the Stirling engine, is stalled.

In an alternative embodiment, the system produces only DC power. This type of system may be used in an array, where multiple generators feed a large aggregating inverter that converts the DC to AC for use by a customer or export to a utility grid.

One embodiment of the invention includes a system equipped with a transient-capacity brake only, instead of a stall-only circuit described above. Such a brake is connected to the DC bus between the rectifier and inverter. In turn, the brake absorbs DC energy as an alternative to the AC energy absorbed by the stall circuit. In another embodiment, the stall circuit is replaced or augmented with a load that is able to absorb continuous-rated AC energy. With only a stall circuit, the system must check for presence of a functional grid before moving the dish on-sun and must transition the dish off-sun immediately upon inverter, grid, or other fault, as the grid is the only continuous load available. With a continuous rated brake, the engine can continue to produce power upon grid loss, so that it can quickly produce power into the grid once it returns to an normal operational state. Another embodiment uses a combination AC and DC load on either side of the rectifier to effectively stall the engine.

The over-stroke protection relay, which connects stall circuitry, is activated in two redundant ways. The first activation mechanism is a hardware circuit that trips at a pre-determined setpoint that is adjustable with discrete components. Once this circuit detects voltage beyond the trip point, the stall circuit components are switched into the circuit via one of the approaches discussed above. Once the stall circuit components are connected to the engine's output, the engine is stalled. The second method of activation is via microprocessor. Under certain fault conditions, the microprocessor may activate the over-stroke relay during a system shutdown sequence, such as that arising from an inverter, grid or other fault. Whether activated from the hardware circuit or from the microprocessor, the over-stroke protection circuit stalls the engine the same way.

According to one embodiment, the engine's cold side is liquid-cooled via a glycol-based coolant that is pumped through a fan cooled radiator. A Stirling cycle produces mechanical motion from a temperature differential. The differential is the temperature difference between the 'hot side' and the 'cold side'. Two radiator fans cool the radiator and are powered with 24V DC at 4.5 amps maximum each. Fan speed is controlled via a 10V PWM signal from the peripheral interface board. Each fan separately provides tachometer feedback to the control electronics for detection of a failed fan. The pump (12V DC, 55 Watt max) is controlled via a serial communication interface or power signal from the control electronics. The pump provides fault information and water jacket temperature via the LIN interface. The pump and fans are controlled to maintain optimal water jacket temperature using feedback from a temperature sensor in or near the coolant flow.

In one embodiment, the energy converting apparatus includes a cold-side heat exchanger that extracts heat from the working fluid on the cold-side of the Stirling engine or ECA by circulating coolant through one passage, the adjacent passage containing the working fluid to be cooled. In one embodiment, after heat is transferred to the coolant from the working fluid, the coolant is further circulated through a radiator with forced-air cooling to reject the heat to the ambient environment. In one embodiment, the temperature difference between the Stirling cycle's hot and cold sides is the thermal potential converted by the Stirling engine into mechanical energy.

According to one embodiment of the invention, faults may be detected and processed by the System Controllers. System faults may include, without limitation, Engine Over-Stroke Fault, Motor Controller Communication Fault, Communication Module Communication Fault, I/O Module Communication Fault, CAN Bus Communication Fault, Inverter Communication Fault, IPM Fault, Tracking Drive Limit Sensor Fault, 24 V DC Bus Fault, Grid Fault, Heater Head Over-Temperature Fault, Water Jacket Over-Temperature Fault, DC Bus Under-Voltage Fault, DC Bus Over-Voltage Fault.

Stirling machine control systems may use various methods to change the operating pressure within the device in an attempt to modify or optimize some other operating parameter. In order to know the operating pressure without any means of direct measurement, the next best parameter to know is the temperature of the converter. If there is also no means of direct measure of the converter temperature, then inference of the temperature can be made through observations of other operating parameters of the machine. This section describes the ability to infer the converter temperature rather than measuring it. The ultimate goal of the approach though is to achieve adequate control of the Stirling machine parameters while measuring a minimum number of instrumentation inputs.

In one embodiment, the Stirling machines described herein use a free-piston. These machines tend to incorporate moving subassemblies, which are suspended within a pressure boundary, arranged so that the moving and stationary elements do not touch during oscillatory motion. At least one of the moving elements of the machine will be an electromagnetic linear actuator, usually coupled to a variable volume space (a piston moving in a cylinder). Depending on the intended use of the Stirling device, this actuator may be referred to as a linear alternator or a linear motor.

The intended function of the electromagnetic actuator is to provide a means of converting between electrical and mechanical power. Without limiting the scope of the description provided, in one embodiment the subassembly of actuator and variable volume is referred to as the "converter." In another embodiment, the term "converter" also includes all required ancillary hardware in addition to the actuator and variable volume. Alternatively, the energy converter is a free piston Stirling engine having an alternator, which generates electricity as the free piston oscillates.

In part, the invention relates to methods of tracking certain states in the machine using parameters other than temperature. As a result, in one embodiment converter temperature sensors are not necessary. This results in a desirable cost savings because additional sensors are not required.

As with any conversion from one form of power to another, there are inefficiencies associated with operation of the converter. In one embodiment, these inefficiencies come primarily in the form of 1) copper losses in the coils of the actuator, 2) iron losses in the stator-iron of the actuator, 3) air-gap losses across the magnets, 4) viscous losses on exposed surfaces of moving components and within the piston clearance seal, and 5) hysteresis losses in the gas that is aft of the variable volume space.

Regardless of the sources of the losses within the converter, the dissipated (lost) power must come out of the operating Stirling machine in the form of heat flow. According to some converter embodiments, exemplary linear-converters can offer a full-load conversion efficiency of about 88-90%, between electrical and mechanical power.

In general consistent with the embodiments described below, it is desirable to implement an ECA that is sensorless or that requires a reduced number of sensors. Although a given ECA embodiment may have a long operating life, the life expectancy of various sensors may be shorter. Accordingly it is desirable to design ECA's that do need temperature sensors and other sensors. A controller or processor that accesses a database or look up table of empirical relationships relating to engine efficiency, thermal resistance between the cold side and the hot side of Stirling engine, hot side temperature, cold side temperature, power, voltage, working fluid pressure, and other parameters can determined correlations between electrically or mechanically measurable parameters such that temperature measurements and other measurements can be determined indirectly. Thus, temperature changes or values can be inferred directly and used to provide a control system feedback without relying on a temperature sensor or other sensors.

Figure 9:
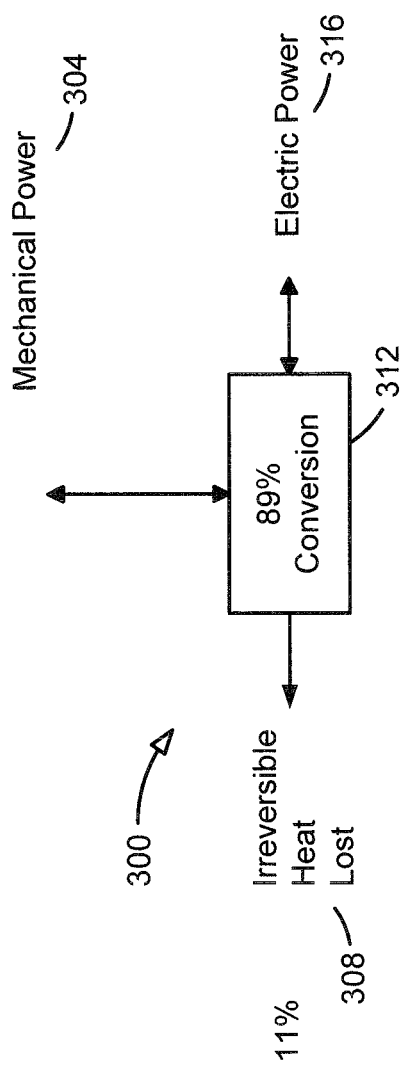
FIG. 9 depicts a schematic diagram of certain operational features of a converter assembly, in accordance with an illustrative embodiment of the invention.

A schematic diagram that depicts certain operational features of a converter assembly 300 embodiment is shown in FIG. 9. In one application, the converter operates an alternator to dissipate mechanical power created by a Stirling engine. In this application, and according to FIG. 9, about 11% of the mechanical power 304 coming into the variable volume space on the face of the piston is "lost" as waste heat 308. The other approximately 89% of the power 312 would leave the device as useful electric power 316 for an end user. A more detailed view of the power flow in the Stirling Converter Assembly is shown below in FIG. 10A. As shown, this flow of power is tied to a schematic representation of the thermal resistance network.

Figure 10A:
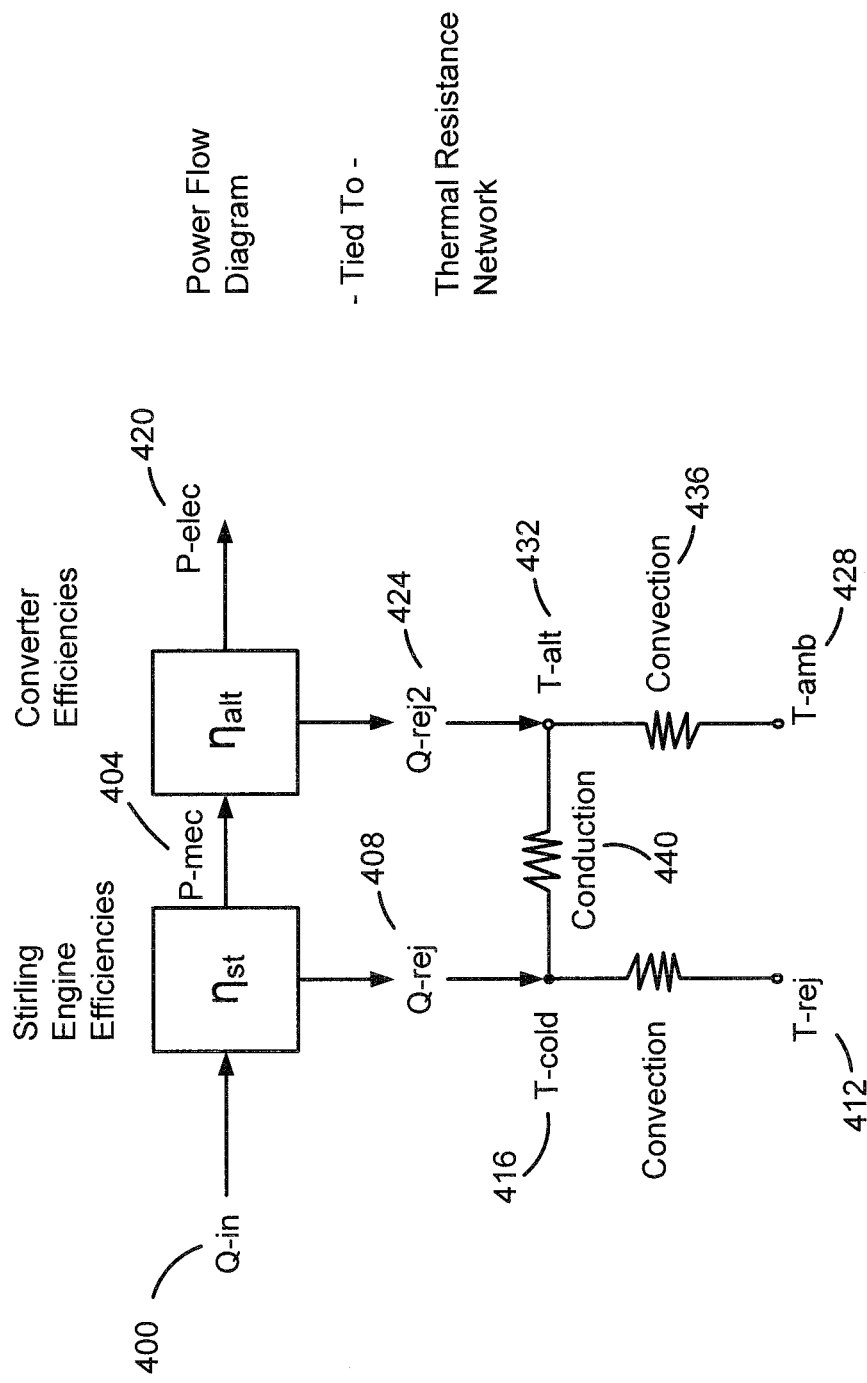
FIG. 10A depicts a schematic diagram of the power flow in a Stirling converter assembly, in accordance with an illustrative embodiment of the invention.

FIG. 10A shows a schematic of various energy exchanges and relationships that are suitable for configuring a processor-based system for controlling an energy converting apparatus such as a Stirling engine. The system can include an electronic memory device and an electronic processor, such as the system controller discussed above, in communication with the memory device. In one embodiment, the memory device includes instructions that when executed by the processor cause the processor to perform various processing steps, such as solving for variables, interpolating data, manipulating mathematical relationships, collecting temperature data and other steps relative to the variables and data shown in FIGS. 10A-10C.

As illustrated in the schematic diagram of FIG. 10A, a Stirling engine absorbs heat (Q-in) 400 from a heat source and converts some of that heat to useful mechanical power (P-mec) 404. The remainder of that is rejected as heat (Q-rej) 408 through some cooling mechanism designed to maintain appropriate temperature conditions with respect to the Stirling engine. The cooling system in some Stirling machine embodiments can include a circulated, pumped loop of coolant that is in fluid communication with the engine to provide a convenient and controlled heat loss path for Q-rej 408. That coolant has a characteristic temperature referred to in the diagram as T-rej 412. In order to transfer its heat to the coolant, the engine has a slightly hotter characteristic "cold end" or "cold side" temperature that is referred to as T-cold 416 in the diagram.

A similar situation occurs with the converter. Mechanical power (P-mec) 404 created by the Stirling engine comes into the converter. Some of this power P-mec 404 is converted to useful electric power (P-elec) 420. The rest is lost from the machine as a second type of reject heat loss (Q-rej2) 424. Certain Stirling machine embodiments tend to have a moving stream of air passing by the converter exterior to provide a useful heat loss path. This moving air is at whatever ambient temperature (T-amb) 428 exists, depending on the location and conditions of the particular installation and Stirling machine design. The converter interior must be at a hotter temperature (T-alt) 432 than its surroundings in order to transfer heat to the surroundings.

In one embodiment, the converter has two potential heat loss paths. One heat loss path is by convection 436 to the stream of moving air around the converter's exterior. The second heat loss path is by conduction 440 through the mounting structures to the "cold-end" or "cold side" temperature sink on the Stirling machine (T-cold) 416. The path chosen by the heat loss will always be the path of least resistance and will depend on each design implementation. Some heat will flow in each direction. The final temperature of the converter is dependent on the characteristics of these heat loss paths and also on the converter efficiency.

The characteristics of each of the heat loss paths and also which heat loss path will be preferred can be determined by approximations and calculations. In a preferred embodiment, test data is a useful source of information regarding how a given design will operate and transfer heat along various paths. By using test data from specific energy converting apparatus design embodiments, both the efficiency of the converter and the characteristics of the actual thermal resistance network can be approximated and characterized. Characterization of these factors for a specific application leads to the ability to accurately predict what temperature the converter will be at for a given set of operating conditions. Empirical data can be collected and stored in a database to generate correlations and models based on the operation of a given energy converting apparatus-based system.

As discussed above, in one embodiment the temperature ratio is determined by collecting empirical data prior to installing a solar converting apparatus that includes a Stirling engine. In one embodiment, the controller or processor for such an apparatus is programmed with the relationship such the temperature ratio can be calculated from P-elec, control voltage and charge pressure (derived from T-alt). In another embodiment, the apparatus includes multiple sensors that gather empirical data specific to that system. Then as sensors fail, the system reverts to sensorless inference of parameters. One advantage is empirical relations based on the specific system being controlled, and not a representative prototype system.

Stirling machines use an enclosed mass of working gas, usually charged to high pressure in order to execute the Stirling cycle and perform the desired operation of the device. There are various portions of the machine, including various fractions of the charge mass, which exist at various temperatures depending on the specific implementation. In various Stirling machine embodiments, the converter tends to enclose the largest volume and fractional mass of working gas as compared to any other space in the machine. The temperature of the converter therefore has dominant control over the operating pressure for the power cycle. The ideal gas law can be used to show that the pressure within the machine, given the charge mass (m) and ideal gas constant (R) for a given working gas, will follow a specific trend based on the temperatures and volumes of the various spaces within the machine. See the equation (1) below.

$$\frac{P}{m \cdot R} = \sum_{i=1}^{n} \frac{T_i}{V_i} \tag{1}$$

This equation recognizes Pressure (P) variations caused by temperature distribution on the machine through a summation of the temperature (T) to volume (V) ratios in various portions of the machine.

In Stirling machines, the ability to control normal operation of the power cycle is strongly influenced by the working pressure. An ability to predict working pressure may lead to some specific operating parameter control choices. In one embodiment, a temperature sensor is installed on the exterior of the machine to help make informed control choices. This sensor can be eliminated however through mathematical inference by understanding the logic presented herein and by measuring parameters at other available sensor locations.

For example, in a commercial Stirling engine application, there can be temperature sensors on the hot end of the engine and on the coolant stream of the engine that will define the operating temperature ratio and will allow inference of the Stirling engine efficiency. There are direct measures of current and voltage that allow for calculation of electric power. Basic knowledge of the converter efficiency allows for calculation of 1) the mechanical power that must exist, 2) the two heat rejection streams that must exist, and 3) the ambient temperature that would constrain or restrict the resulting measured coolant temperature. With the known characteristics of the thermal resistance network for this engine, the control software can determine what the converter temperature must be for normal operation. That calculated converter temperature can replace the need for a sensor and still afford the same information to control logic that might be used to manipulate the pressure within the device.

Figure 10B:
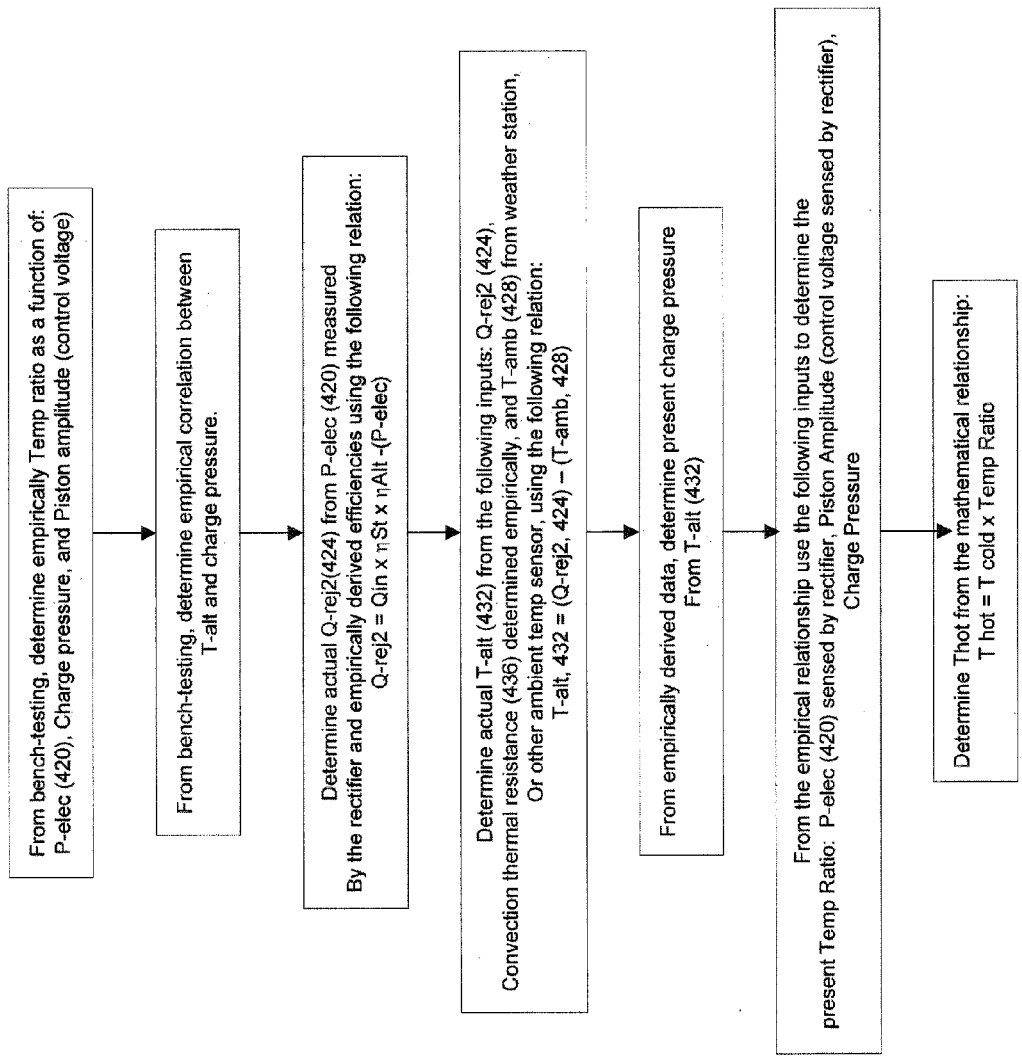
FIGS. 10B and 10C depict process flows for indirectly determining hot and cold side energy converting apparatus temperatures, respectively, in accordance with an illustrative embodiment of the invention.

FIG. 10B shows a process flow for determining the hot-side temperature of the Stirling cycle, or $T_{hot}$, using a processor instead of sensing directly. The advantage of inferring this temperature versus sensing directly is elimination of sensor(s) which add cost, may be inaccurate and can fail over time. Through inference from data gathered empirically, data from other sensors, and knowledge of the engine's thermal resistance network, $T_{Hot}$ may be inferred.

In one embodiment, bench testing is conducted to empirically determine the relationship between Temperature Ratio (the ratio of the engine's hot-side to cold-side temperatures) and three parameters: electric power (P-elec, 420), charge pressure of the engine's working fluid, and piston amplitude as approximated by the alternator's control voltage as sensed by the rectifier. Also from bench testing, the empirical correlation between the alternator temperature (T-alt) and charge pressure is determined, as well as efficiencies of the Stirling engine ($\eta_{st}$) and the converter ($\eta_{alt}$).

As referenced in FIG. 10A, Q-rej2 (424) is determined from the following equation, using DNI (direct-normal insolation) to approximate Qin and electric power sensed at the rectifier:

$$Q\text{-rej2} = Q\text{in} \times \eta_{st} \times \eta_{alt} - (P\text{-elec})$$

Using Q-rej2, and with empirically derived convection thermal resistance (436) and ambient temperature (Tamb, 428)

from a weather station or other ambient temperature sensor, alternator temperature (Talt) may be calculated using the following relation:

$$Talt[432]=(Q\text{-rej}2[424])-(Tamb[428])$$

From the empirically derived relationship mentioned above, actual charge pressure is determined from Talt. And, also from empirical data, actual temperature ratio is determined using the following inputs: P-elec (420) as sensed by the rectifier, piston amplitude as approximated by control voltage sensed at the rectifier, and charge pressure. From the temperature ratio, $T_{Hot}$ is determined from the following equation:

$$T_{Hot}=T_{Cold}\times(\text{Temp Ratio})$$

Figure 10C:
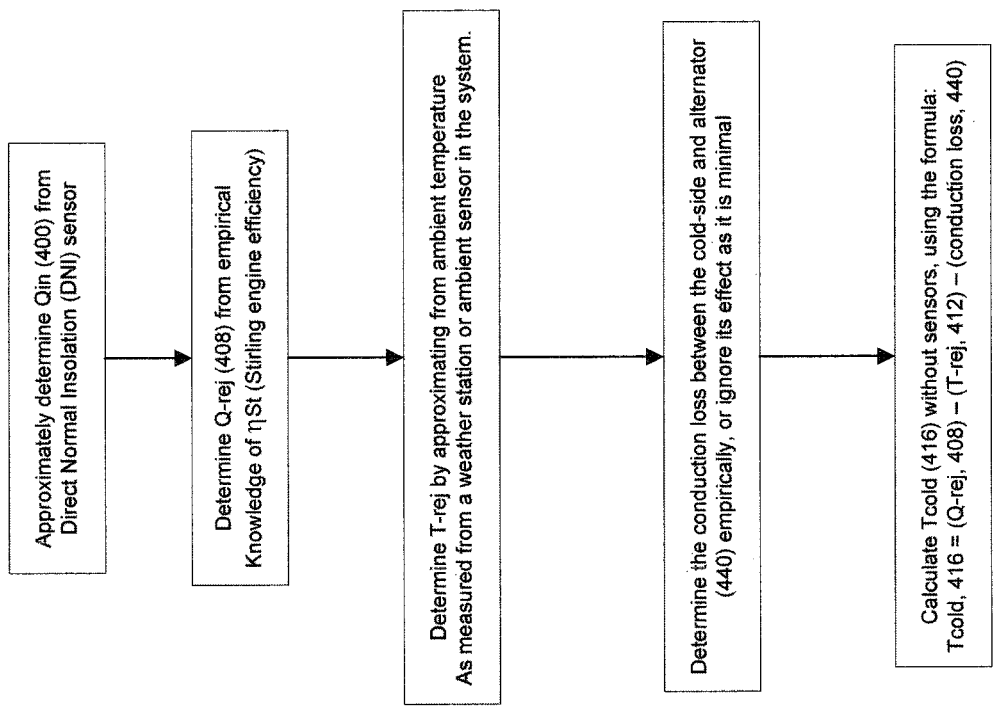

FIG. 10C shows a process flow for determining the engine's cold-side temperature ($T_{Cold}$) using a processor. The advantage of inferring this temperature versus sensing directly is elimination of sensor(s) which add cost, may be inaccurate and can fail over time.

In one embodiment, Qin (400) is approximated from a DNI (direct-normal insolation sensor). In reference to FIG. 10A, Q-rej (408) is determined from empirical knowledge of the Stirling engine efficiency ($\eta_{st}$). The engine's rejection temperature (T-rej) is approximated from ambient temperature as sensed by a weather station or ambient temperature sensor in the system. The conduction loss (440) between the cold-side and the alternator is determined empirically, or ignored due to its negligible effect. And the cold-side temperature is calculated using the following formula:

$$T_{Cold}[416]=(Q\text{-rej}[408])-(T\text{-rej}[412])-(\text{conduction loss}[440])$$

In one embodiment, it desirable to implement an ECA that is sensorless or that requires a reduced number of sensors. One processor based method which can include one or more of the following step is outlined below.

In one embodiment, DNI is measured by an onboard sensor or can be acquired from a remote location, such as, for example a weather station. The predicted heat input can generated using a computer model or other previous historical knowledge from data collected from the ECA during operation. The likely or expected heat input is then used to approximate engine efficiency using a computer model or other historic device data. In one embodiment, mechanical power can be approximated based on a computer model or other previously obtained ECA datasets. Next, electrical power (or the associated voltage) being generated by the ECA is measured.

Predicted mechanical power and electrical power can be compared to assess whether the system is performing within safe operational limits. If the system is not operating within predetermined limits or ranges, an alert or alarm can be generated notifying the operator of the deviation. If the system is operating within such predetermined limits, heat lost from the alternator can be calculated, and ambient temperature determined from an onboard sensor or from data acquired from a remote location, such as a weather station. Intermediate temperatures suitable for solving the expected heat transfer or hot side/cold temperature ratios are calculated using a thermal resistance network and a computer model or other device data.

In one embodiment, the "cold side" temperature is determined as outlined in FIGS. 10A-10C. However, it is also possible to use a sensor (e.g., a pump sensor) to directly measure the cold side temperature or to approximate cold side temperature from the alternator temperature. As discussed above, approximate operating pressure and approximate piston amplitude can be calculated from the alternator temperature based on a computer model or other data. In one embodiment, the power ratio, a characteristic ratio of the ECA, can be determined by calculating the ratio of power coming out divided by operating pressure, with that ratio further divided by piston amplitude. The temperature ratio associated with the power ratio can be determined based on a computer model or correlating relationships with historic ECA data.

In one embodiment, the hot side temperature is determined by multiplying the temperature ratio by the appropriate cold side temperature. Finally, an expected peak temperature based on the average hot side temperature can be determined. In one or more embodiments, these measurements and determinations allow feedback to be generated without requiring or using a direct temperature measurement and an associated sensor.

One embodiment of the invention includes a 3 kW solar Stirling energy converting apparatus. The energy converting apparatus is designed to operate under temperatures of −4 to 131 degrees Fahrenheit (−20 to 50 degrees C.). The electronics of the energy converting apparatus will withstand a condensing humid environment via conformal coating, hermetically sealed connectors, and other humidity protection means. Additionally, the energy converting apparatus is designed to operate at altitude up to 6,200 feet (1,890 meters) with provision for an inverter/rectifier cooling fan (or extended heat sink) to meet cooling requirements at the high end of the elevation range.

The electronics of a sensor interface board (SIB) can withstand continuous vibration with force of ≤50 N, 60-65 Hz (about 0.1 g). In one embodiment, some or all of the other electronics are designed to withstand vibration from transportation from the factory to the installation site.

Internal communications are implemented via a 2-wire CAN (Controller Area Network, a type of high-speed serial communication network) protocol utilizing custom command syntax. External communication by the energy converting apparatus will be implemented via standard Ethernet protocol with custom command syntax.

The energy converting apparatus includes a sensor interface. The sensor interface drives two radiator cooling fans (up to 90 Watts each), and receives each fan's tachometer feedback signal for purpose of fault annunciation and optimizing control. The printed circuit board assembly (PCBA) provides an open-collector, pull-up to 5V filtered pwm, with provision (if unpopulated) for unfiltered PWM control output The sensor interface provides 24V DC to drive the pump (up to 90 Watts). The energy converting apparatus converts the 24V DC to 10V DC with a DC/DC converter. PWM speed control is the baseline circuit, unfiltered (pulse output) which the energy converting apparatus modifies to provide a 12-15V PWM signal. Alternatively, the SIB may provide a LIN interface for bi-directional communication with the pump (speed commands and fault codes), and a 12V supply voltage (up to 90 W, 7.5 A). The bi-directional operation of various implementation of the electric topology allows battery charging, pump fan powering, etc. prior to power production using the energy converting apparatus.

The energy converting apparatus also includes 4 flux sensor inputs, each with one Type-N thermocouple (range is from −22° C. to 700° C.) which is −1 mV to 25 mV. Four absolute temperature amplifiers and two differential amplifiers are included. In one embodiment, to monitor the heater head temperature the sensor interface board includes two RTD sensor inputs for two sensor bodies sharing a common connector.

In order to monitor the water jacket temperature, the sensor interface includes an input to read a two-wire 1000 ΩRTD (resistive thermal device) indicating water jacket temperature. Alternatively, the water jacket temperature may be determined from a sensor in the water pump, via communication over the communications bus, such as a serial LIN (Local Interconnect Network) interface.

The sensor interface shall include inputs to read two 3-wire switching Hall effect limit sensors to monitor piston-stroke detection. One sensor serves as a backup should the first sensor fail.

The features and specifications of the energy converting apparatus, according to one embodiment may be physically implemented in many ways to accomplish the advantages and results described herein. The following is merely an illustrative example of a physical implementation of the electrical topology of a solar Stirling energy converting apparatus.

In part, some of the embodiments described herein relate to various control systems. For example, FIGS. 8 and 11-13 depict various control system and sensor elements used to regulate the operation of an energy converting device or an overall energy converting system.

Figure 11:
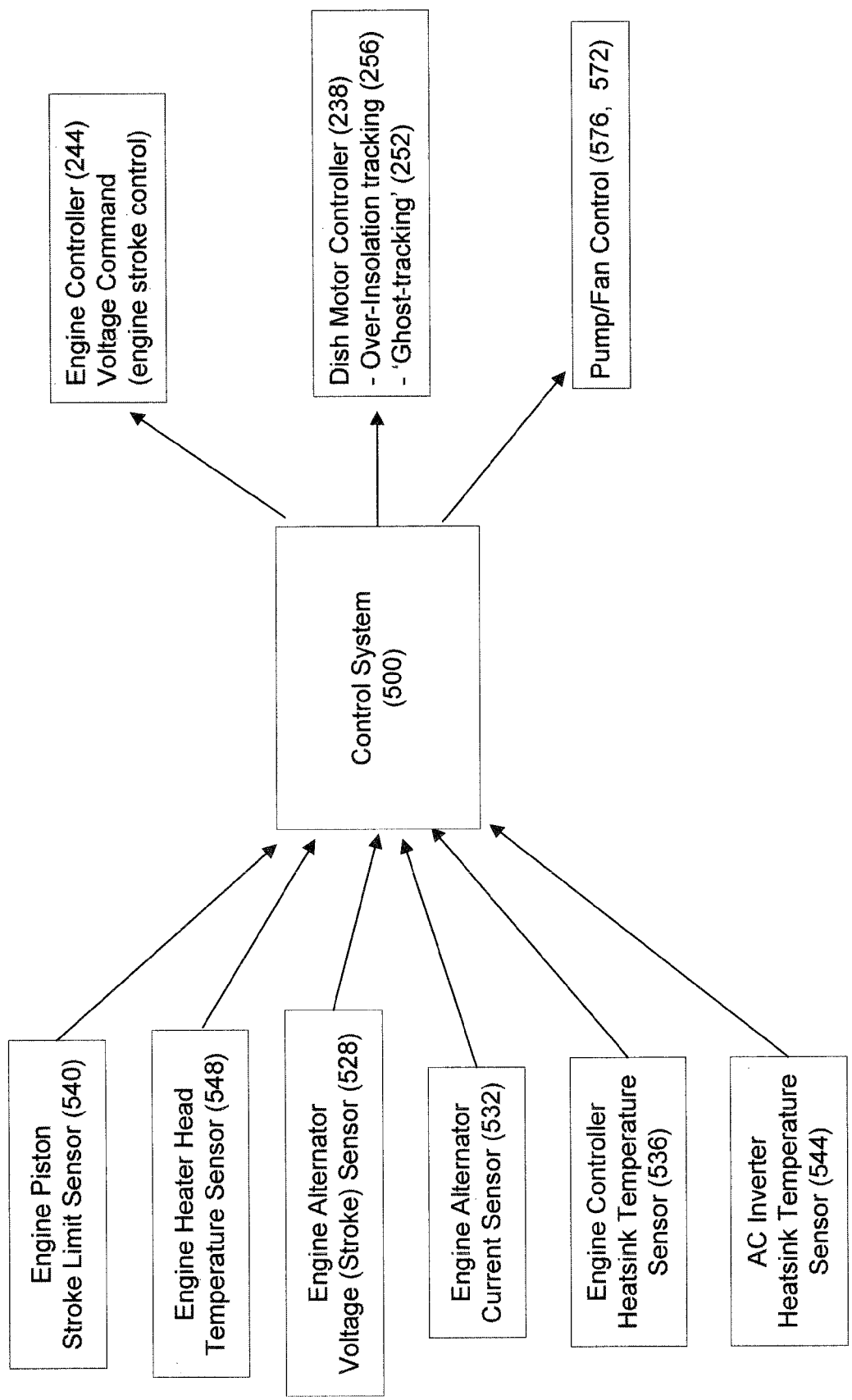
FIG. 11 depicts various sensor inputs to a control system embodiment and the components that are regulated or monitored by the control system, in accordance with an illustrative embodiment of the invention.
Figure 12:
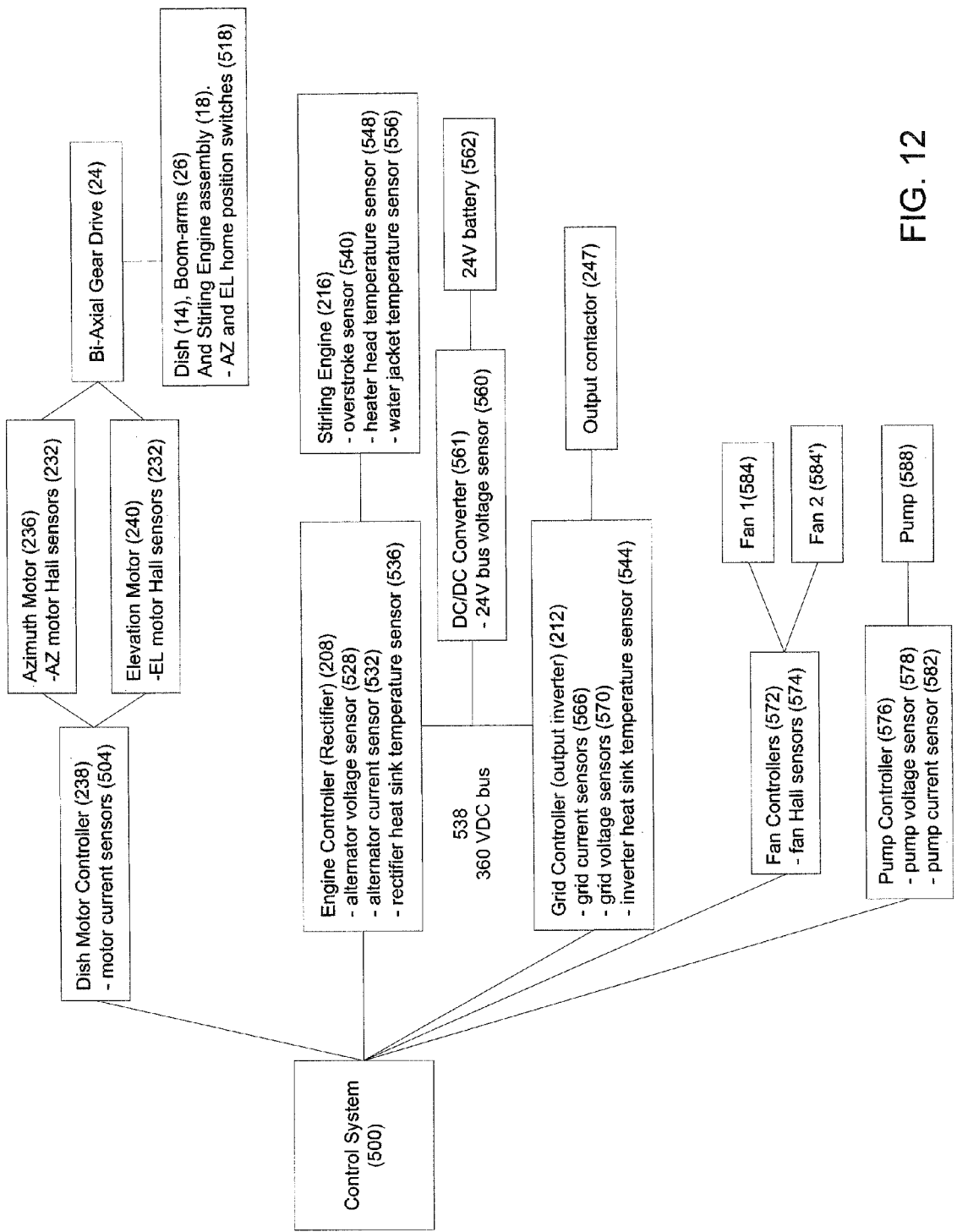
FIG. 12 is a block diagram that depicts an exemplary control system with various sensors and other mechanical and electrical energy collecting system components, in accordance with an illustrative embodiment of the invention.
Figure 13:
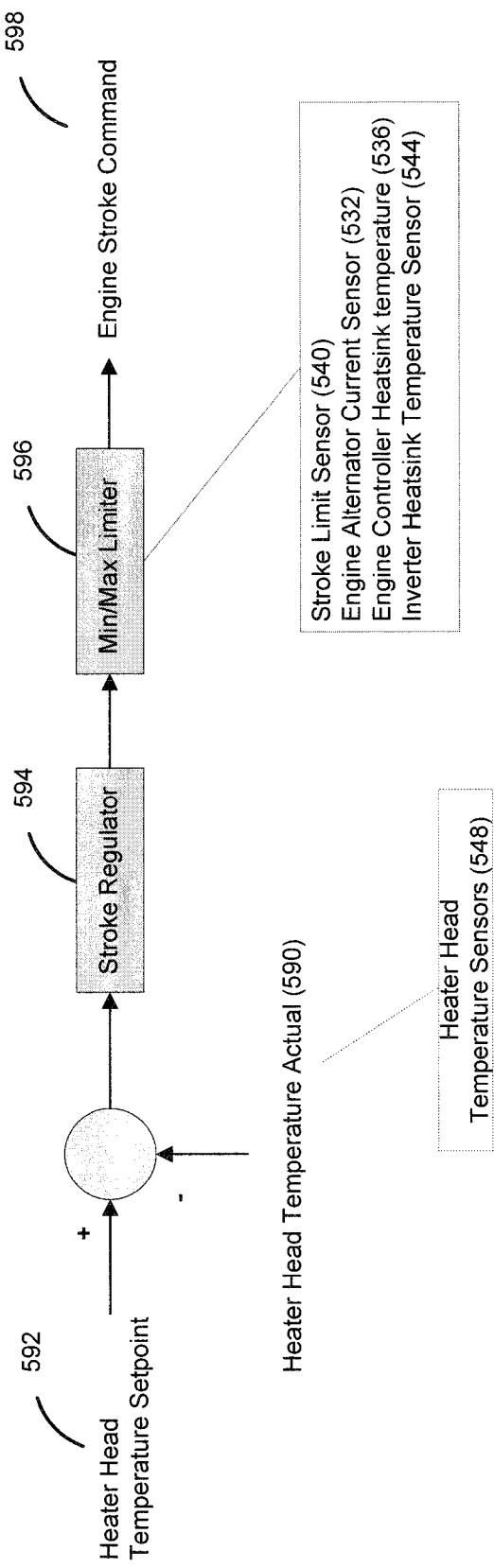
FIG. 13 is a control diagram that depicts an exemplary control mechanism based on temperature inputs and stroke control, in accordance with an illustrative embodiment of the invention.

FIG. 12 is a block diagram that depicts an exemplary control system with various sensors and other mechanical and electrical energy collecting system components in accordance with an embodiment of the invention. In turn, FIG. 11 shows various sensor input and output signals used to control head temperature. FIG. 13 is a control diagram showing how various sensor inputs are used to derive the engine stroke command, for controlling heater head temperature.

Throughout FIGS. 11-13, various sensors are incorporated in different devices and subsystems to capture data, which can be used by the control system 500 to track the sun, transition between operational states as shown in FIG. 8, safeguard the engine, system, and their sensitive components from over-insolation, adjust engine stroke as discussed below with respect to FIG. 13, and perform any other suitable function with respect to which system data is a meaningful input. Accordingly, to understand the control system it is useful to consider the sensors and related elements and subsystems.

Dish motor current sensors 504 monitor the current provided to the Azimuth 236 and Elevation 240 motors independently. If the current feedback indicates a motor is consuming the maximum current amount that the motor controller 238 can produce (about 14 Amps, in one embodiment), then the motor shaft is precluded from rotating. This occurs because meeting or exceeding the current maximum is likely due to a fault condition (binding gears, dish obstruction with post, etc). The control system takes preventative action to protect the motor in response to current sensor data.

Dish motor Hall sensors 232 are used to provide feedback to the motor controller 238 for rotational control. Hall sensor pulses are also counted by the controller to determine dish position. As a result, data from the dish motor hall sensor provides the control system with valuable information regarding motor operation for tracking and other features of interest for the various operational states.

In one embodiment, there is one home position sensor (e.g., a reed switch or Hall sensor) 518 on each axis associated with positioning the dish. When the dish moves across such a switch or sensor, it changes state, providing a consistent location reference point. All dish movements are then made relative to the fixed location provided by the home sensors. This gives the control system a baseline for many of the operational states and functionalities described herein.

The rectifier AC voltage sensor 528 detects the voltage at the input port or input terminals or ports of the rectifier. The role of the rectifier is to control the stroke of the Stirling engine via control of the terminal voltage, and convert the engine's AC power to DC. This detected terminal voltage is a proxy for the back EMF (electromotive force) of the engine's piston, which is coupled with the permanent magnet in the linear alternator. The voltage is directly proportional to the piston speed. With piston speed and frequency known, the amplitude of piston stroke may be inferred. The control system regulates the piston's stroke to optimize system performance (see FIG. 13 and related description). In one embodiment, piston stroke is the amplitude of the piston stroke. In one embodiment, a hunting algorithm or look-up table is used to maximize power production by varying piston stroke. Maximum power production (highest efficiency for a given Qin) may not necessarily correlate to the highest heater head temperature, as there are a number of factors that contribute to efficiency. In addition to Carnot efficiency of the Stirling Cycle, there are also receiver thermal energy losses, $I^2R$ losses (thermal losses related to amperage level) and a number of other mechanisms that contribute to total efficiency.

The rectifier's DC voltage sensor 528 is used by the rectifier to monitor the DC bus level and shutdown if the bus level exceeds normal operating limits. Though the rectifier produces DC power into the DC bus, the DC bus level is controlled by the inverter.

The rectifier's current sensor 532 provides alternator current feedback. Under circumstances when this current reaches a level that exceeds safe thermal limits for the power electronics, the controller takes action. Suitable action can include, but is not limited, to increasing piston stroke to reduce the current to a sustainable level. In addition, this sensor is shown in FIG. 11 as a control system input.

The rectifier's heat sink temperature is monitored by a sensor 536 to ensure that the thermal limits of the solid state switching devices are not exceeded. Several factors contribute to setting and evaluating this temperature threshold. Two such factors are ambient temperature and engine alternator current levels. If thermal limits are reached, action by the control system is taken, such as adjusting the operating point of the engine by increasing stroke to reduce current. Alternatively, if the stroke limit has already been reached, initiating over-insolation control can be commenced to limit heat energy into the receiver. In addition, this sensor is shown in FIG. 11 (Engine Controller Heatsink Temperature Sensor 536) as a control system input. This sensor (and any other temperature sensor coupled to the engine or other subsystems) can generate data suitable for triggering ghost tracking or over-insolation tracking. In addition, control of the fans 584, 584' and pumps 588 can be regulated using a feedback loop with data from this temperature sensor and other temperature sensors used in the overall energy converting system.

In one embodiment, Hall sensors are located in the linear alternator of the engine and are positioned to change state when the piston reaches the extreme end of its motion, just prior to hitting the end stop. This sensor may be used by the control system to reduce stroke if pulses are detected, or to increase stroke to a level corresponding to the safest maximum displacement. This sensor may also be referred to as engine piston stroke limit sensor 540 as shown in FIG. 11 as a control system input.

The inverter's heat sink temperature is monitored by a sensor 544 to ensure that the thermal limits of the solid state switching devices are not exceeded. Several factors contribute to setting and evaluating this temperature threshold. One such factor is ambient temperature and engine power level. If thermal limits are reached, action by the control system is taken, such as initiating over-insolation control to limit heat energy into the receiver. In addition, this sensor is shown in FIG. 11 (AC Inverter Heatsink Temperature Sensor 544) as a control system input. This sensor (and any other temperature sensor coupled to the engine or other subsystems) can generate data suitable for triggering ghost tracking or over-insolation tracking. In addition, control of the fans and pumps can be regulated using a feedback loop with data from this temperature sensor and other temperature sensors used in the overall energy converting system.

Engine heater head temperature sensors 548 are located near the heater head in a cooler location or safe zone (i.e., one that allows high sensor reliability). These remote sensors collect delayed temperature information that provides a proxy for heater head temperature. The sensors are used for feedback by the stroke regulator to achieve the optimal stroke setting for a given operational parameter. Carnot efficiency for the engine increases as the heater head temperature increases. For constant energy into the head, as stroke increases, heater head temperature is drawn down. As stroke decreases, the heater head temperature increases.

In one embodiment, a hunting algorithm is used to optimize stroke over time based on temperature data originating from the temperature sensors positioned on the heater head. In one embodiment, a hunting algorithm is used to optimize stroke over time based on temperature data originating from the temperature sensors positioned in a safe zone relative to the heater head. In one embodiment, a hunting algorithm is used to optimize stroke over time based on the first derivative of temperature with respect to time as applied to temperature data originating from the temperature sensors positioned in a safe zone relative to the heater head. Some of these features are discussed below relative to FIG. 13. In addition, this sensor 548 is shown in FIG. 11 as a control system input.

The rectifier's current sensor 532 provides alternator current feedback. Under circumstances when this current reaches a level that exceeds safe thermal limits for the power electronics, the controller takes action. Suitable action can include, but is not limited to increasing the piston stroke to reduce the current to a sustainable level. In addition, this sensor is shown in FIG. 11 as a control system input.

A water jacket sensor 556 can be used to detect proper operation of the cooling system. It can also be used to regulate the pumps and fans for optimal control.

The 24VDC bus sensor 560 is used to monitor the health of the 24V system. In one embodiment, it is connected to the inverter 212. Since this system supplies the dish motors and is critical for safe stowing of the dish, a health check of the 24V batteries 562 is performed using this sensor. In one embodiment, this check is performed on a daily basis before the dish is enabled for slewing to sun.

Inverter current sensors 566 are used for control of the inverter and for protection of the solid-state circuitry. If sensed current exceeds the safe operating limits of the circuitry, the circuit functions may be stopped to protect the hardware before damage results.

Inverter voltage sensors 570 are used to control the inverter, and for monitoring the operation of the grid within certain compliance levels. If voltage or frequency values deviate from a specified safe operating level, as measured by the inverter sensors, protective relay functions are activated. An example of such a grid protective relay function is over-voltage detection, in which voltage exceeding a predetermined maximum is detected by the inverter voltage sensors and the inverter is shut down by the control system until the grid voltage returns to compliance. Upon return, the inverter waits a pre-determined, legally required time duration before re-connecting to the grid.

Fan Hall sensors 574 are used to detect fan rotation and are used for generating alarms or other indications of a fault. In one embodiment, these sensors are also used to determine which of a plurality of fans is in need of repair.

The pump voltage sensor 578 is used for determining the health of the pump and the operational level of its power circuitry. When the sensor indicates a problem, the control system stops system operation to prevent overheating and damage to system components.

The pump current is monitored by a sensor 582 to detect pump cavitations due to a gas bubble or other event of interest in the system. Alternatively, this sensor can detect a blockage in the coolant flow. If such a problem is detected, the control system can take one or more subsystems offline to prevent damage or generate a suitable alarm. All of the alarms described herein can be relayed to a remote station or operator in one embodiment.

These sensors are used to implement some of the features and subsystems shown in FIGS. 8, 11-13. For example, in FIG. 12 the control system is linked to a plurality of sensors in order to regulate and monitor the dish motor, engine, grid, fan and pumps. Control of the dish motors (azimuth and elevation) is suitable for regulating and transitioning between the operational states shown in FIG. 8 and as otherwise discussed above. Similarly, the pump controls 576 and fan controllers 572 are monitored for errors and can be used as a trigger to take the system offline to prevent engine damage.

The role of the rectifier is to control the engine within safe operating limits and to optimize system performance based on a number of inputs, not limited to Carnot efficiency, receiver convection losses, and $I^2R$ current losses. Carnot efficiency is inferred from the ratio of the hot and cold temperatures of the engine. In one embodiment, the hot temperature is measured using heater head temperature sensors and the cold temperature is inferred from the water jacket temperature sensor. The output of the rectifier is DC power, which is fed to the inverter via the DC bus 538.

The inverter's role is to regulate the DC bus while producing AC current into the utility grid. The inverter regulates the DC bus level by producing more or less current into the grid in balance with the power supplied by the rectifier. If the DC bus level falls, the inverter produces less current into the grid to arrest the fall. If the DC bus level rises, the inverter produces more current into the grid to arrest the rise. The inverter also monitors the grid to ensure it is compliant with voltage and frequency limits. If the grid voltage and/or frequency stray outside of these limits, the inverter detects this through its protective relay functions, and power production to the grid is ceased.

The grid serves as both the electrical load for the system's output and as a power source (for battery charging, dish motoring, pumps, fans, etc) for the system when it is not producing power. In one embodiment, there is no alternative continuous rated load for the system's output. Therefore, if the grid falls out of compliance, the system must be shutdown. The shutdown involves stalling the Stirling engine and pointing the dish away from the sun to stop the flow of thermal energy into the heater head.

Electrical isolation between the inverter and the grid is provided in one embodiment by an output contactor 247. In this embodiment, the inverter has voltage sensors on the grid-side of the contactor. This allows the inverter to sense the grid voltage and frequency and determine compliance before the contactor is closed and the inverter's output is tied to the grid.

Having considered various sensors and control system features above, it is useful to now focus on one of the preferred controls system features of the engine. Specifically, piston or engine stroke, sensor inputs, and overall engine optimization are all related via a time-varying optimization software routine. The underlying basis for this approach is described in FIG. 13.

FIG. 13 is a control diagram that depicts an exemplary control mechanism based on temperature inputs and stroke control in accordance with an embodiment of the invention. From a control electronics perspective, there is one exemplary parameter that is particularly useful in controlling and optimizing engine performance. This parameter is terminal voltage, which directly correlates to engine or piston stroke. As terminal voltage decreases, engine stroke likewise decreases. Under these circumstances less heat is being pumped away from the engine.

When control system increases the stroke, more heat is being pumped away from the engine. The control system can vary heater head temperature by changing the stroke such that there are different operating points with the same solar energy input. If the control system keeps the heater head at a high temperature, the Carnot efficiency of the energy is maximized. This also leads to increased loss at the cavity receiver. However, Carnot efficiency generally dominates and is the sought after effect. The control system can use temperature feedback and stroke parameters as part of a feedback loop as shown in FIG. 13.

As shown in FIG. 13, heater head temperature sensors 548 measure the actual heater head temperature 590 (with some degree of lag). This temperature is one possible input into the control system 500. A heater head temperature setpoint 592 is another input. This setpoint represents a changing optimized temperature at which the overall efficiency of the engine as measured by maximum power output achieved. This setpoint can change overtime based on variations in ambient temperature, sun availability, and many other factors. As the actual temperature of the heater head deviates from the setpoint (which is also periodically calculated and updated based on macro conditions) adjustments are made to the engine stroke to return to the setpoint value temperature. In parallel with such stroke adjustments, tracking and other operational states may be varied to provide sufficient solar energy to maintain the setpoint optimized temperature.

Specifically, if a drift from the setpoint 592 occurs, the stroke regulator 594 which compares actual stroke to a stroke target to produce an error value which is used to increase/decrease the stroke command, sends a stroke command to the min/max limiter 596. The min/max limiter ensures the stroke command 598 does not exceed predetermined min/max limits. If the stroke command is within the limits, it is not affected by the min/max limiter. If, for instance, the stroke command exceeds the max limit, the min/max limiter passes the max value as the stroke command. This stroke regulator calculates the necessary stroke to return the heater head temperature 590 to the setpoint 592.

In one embodiment, the min/max limiter 596 also receives data from the stroke limit sensor 540, the rectifier current sensor 532, the rectifier heat sink temperature sensor 536, and the inverter heat sink temperature sensor 544. For example, data from the stroke limit sensor may be used to reduce the max stroke limit if Hall pulses indicate the max stroke limit is too high. In another example, the min stroke limit may be increased in response to data from the rectifier current sensor if current is approaching an upper limit.

Finally, once this calculation is complete, a PWM (pulse-width modulated) control signal is sent to the rectifier's solid-state switching devices and the engine's stroke is increased or decreased as AC current drawn from the engine is decreased or increased respectively.

Accordingly, with all of the sensor information that is available for the control system, temperature feedback and other classes of sensor data can be used to regulate engine stroke and optimize overall efficiency. With respect to sensor placement, if the temperature sensors were placed at the heater head, they would be damaged by excessive heat. Locating such sensors or detectors further away from the heater head reduces their temperature exposure, but introduces a time delay, or lag, between the rise in temperature at the heater head and the rise in temperature detected at the sensor location. Since heater temperature is one input for regulating engine stroke any lag associated with temperature detection can translate to a delay in stroke regulation. Accordingly reducing the lag is desirable, as it results in the sensors more accurately reflecting true heater head temperature. The temperature measured at a safe zone relative to the heater head can range from about 400 Celsius to about 600 Celsius in one embodiment.

As noted above, since the sensor is at a location removed from the heater head, there is a sensing lag. The heater head temperature can change quickly and the sensors do not detect a meaningful change without time delay. In one embodiment, the thermal delay is managed by using set points and delays in the system that compensate for the lag. In addition, as discussed above, optimum efficiency may not occur at maximum heater head temperature; it may be at a lesser temperature or range. The temperature sensor feedback loop can identify this operating point (or range) over time and help the engine stay in an optimal state.

In one embodiment, in order to mitigate the lag effect, rather than measure the temperature directly, the change in temperature over time is measured (dT/dt). Since the change in temperature can be detected with more sensitivity than absolute temperature, by measuring the change in temperature relative to time, or, first derivative, the problem with sensing lag is reduced. This improves overall system operation and longevity.

Figure 14A:
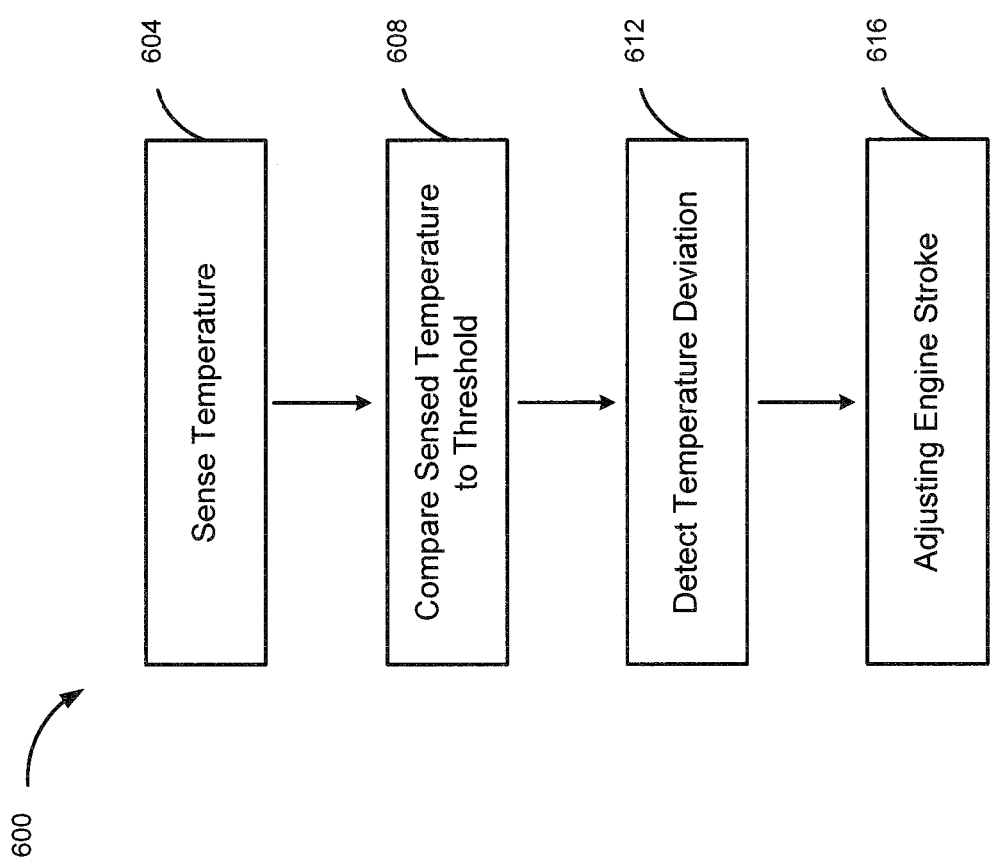
FIG. 14A is a process flow relating to temperature detection, in accordance with an illustrative embodiment of the invention.

Accordingly, in light of the description provided above, in part the invention relates to a method of controlling a Stirling engine based energy converting apparatus having an engine, an associated engine temperature sensor, and a stroke controller. As shown in FIG. 14A, the method 600 can include the steps of sensing a temperature of the engine or a heater head coupled to the engine 604; comparing the sensed temperature to a temperature setpoint or threshold 608; detecting when the sensed temperature and setpoint differ by a predetermined amount 612; and adjusting engine stroke using the stroke controller when the setpoint and sensed temperature differ by the predetermined amount such that the engine temperature (or heater head temperature) returns to the setpoint or a proxy thereof 616.

Figure 14B:
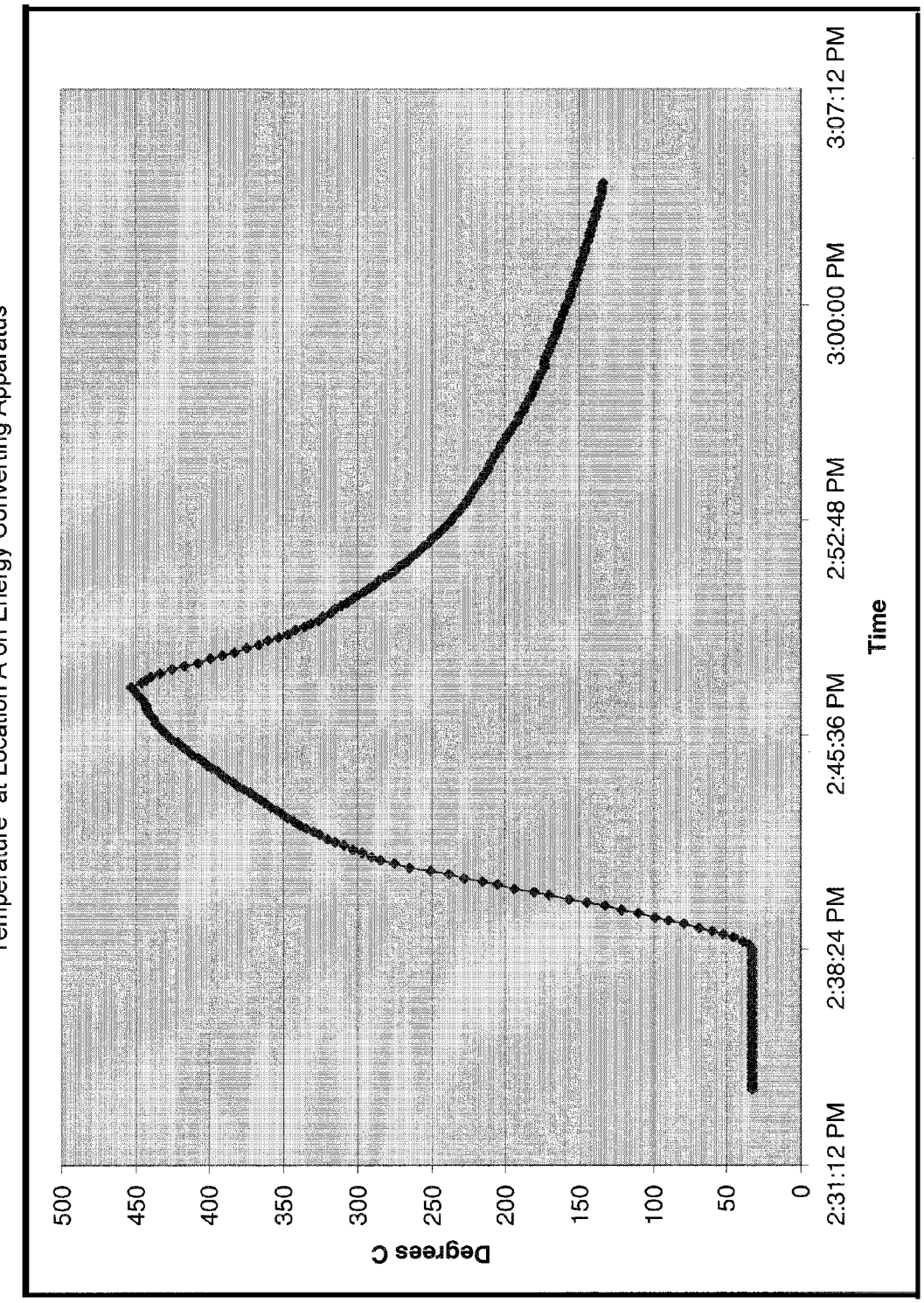
FIGS. 14B and 14C are plots showing temperature data, in accordance with an illustrative embodiment of the invention.
Figure 14C:
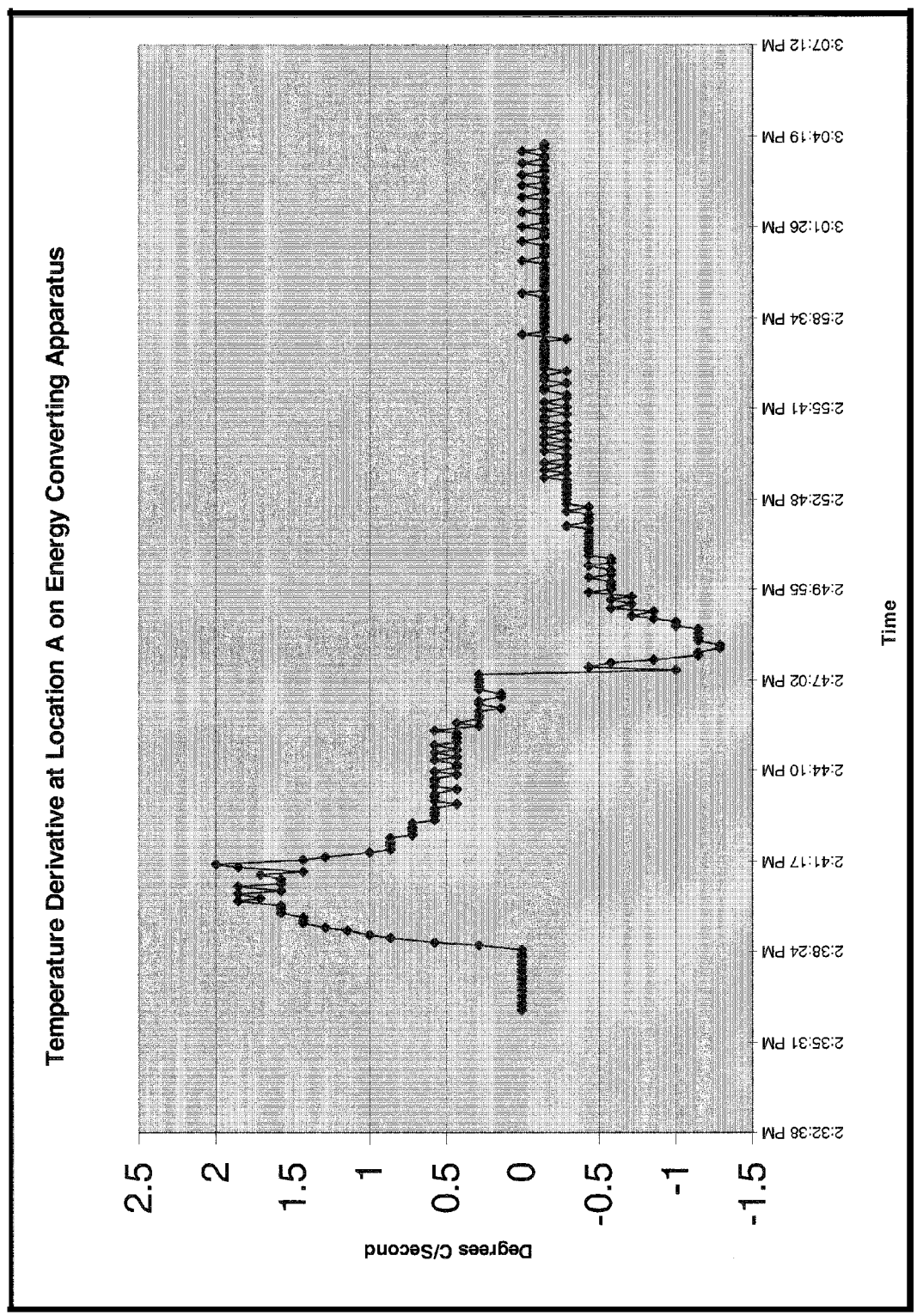

As shown in FIG. 14B, the temperature of a location on the energy converting apparatus such as for example the heater head is graphed as it changes over time. The control system uses this particular temperature for feedback to make adjustment to dish position and to the engine's stroke through control of alternator voltage. In contrast, in FIG. 14C, the time derivative of the curve shown in FIG. 14B is shown.

In one embodiment, it is advantageous to use the first derivative of temperature for feedback rather than absolute temperature, since the derivative reacts with more sensitivity. As the graphs show, approximately 12 seconds after the start of the temperature rise, the derivative reaches nearly half of its full-scale value, or 1 degC/sec. In that same time, the absolute temperature has risen 12 degrees, which represents less than 1% of its full-scale value. The scale difference allows electronics to detect the derivative with more sensitivity and allows more precise control. Thus, a 10 or so degree change in temperature may be within the noise range when direct temperature measurements are taken. However, when the first derivative of temperature is tracked or monitored periodically or in real time the control system can react on expedited basis in response to the early indication of temperature change event, such as over heating or failing to track the sun.

Figure 15A:
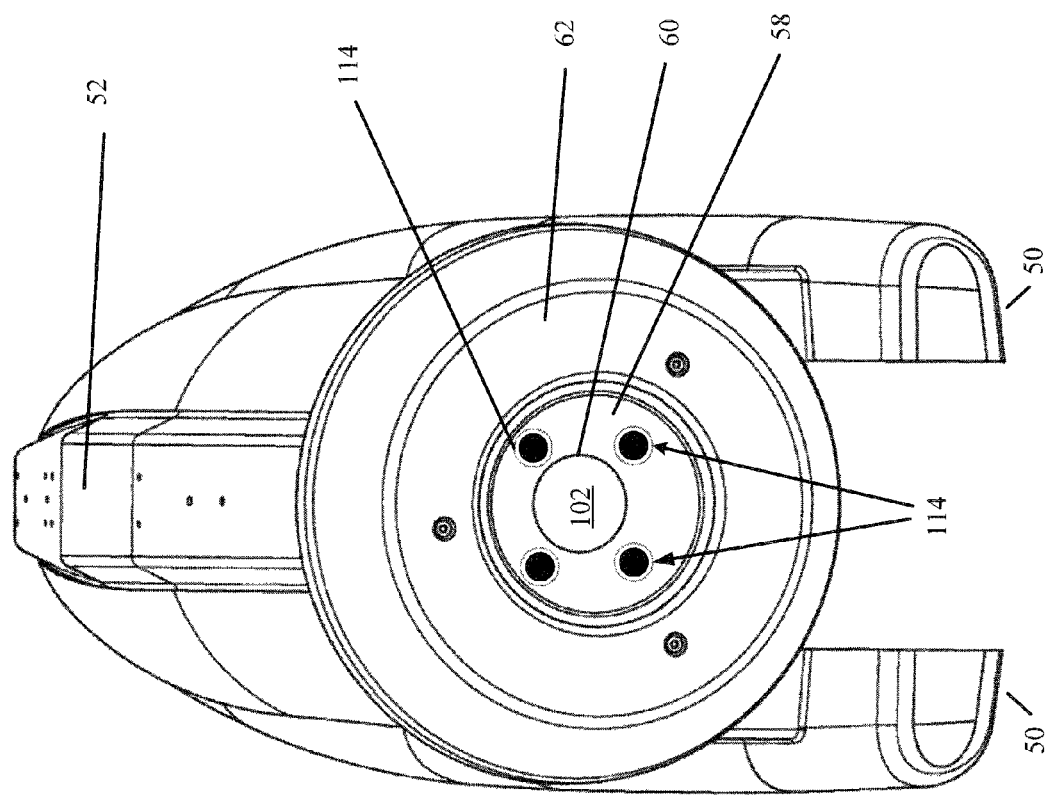
FIGS. 15A-15C are schematic diagrams depicting various auto-commissioning systems, in accordance with an illustrative embodiment of the invention.
Figure 15B:
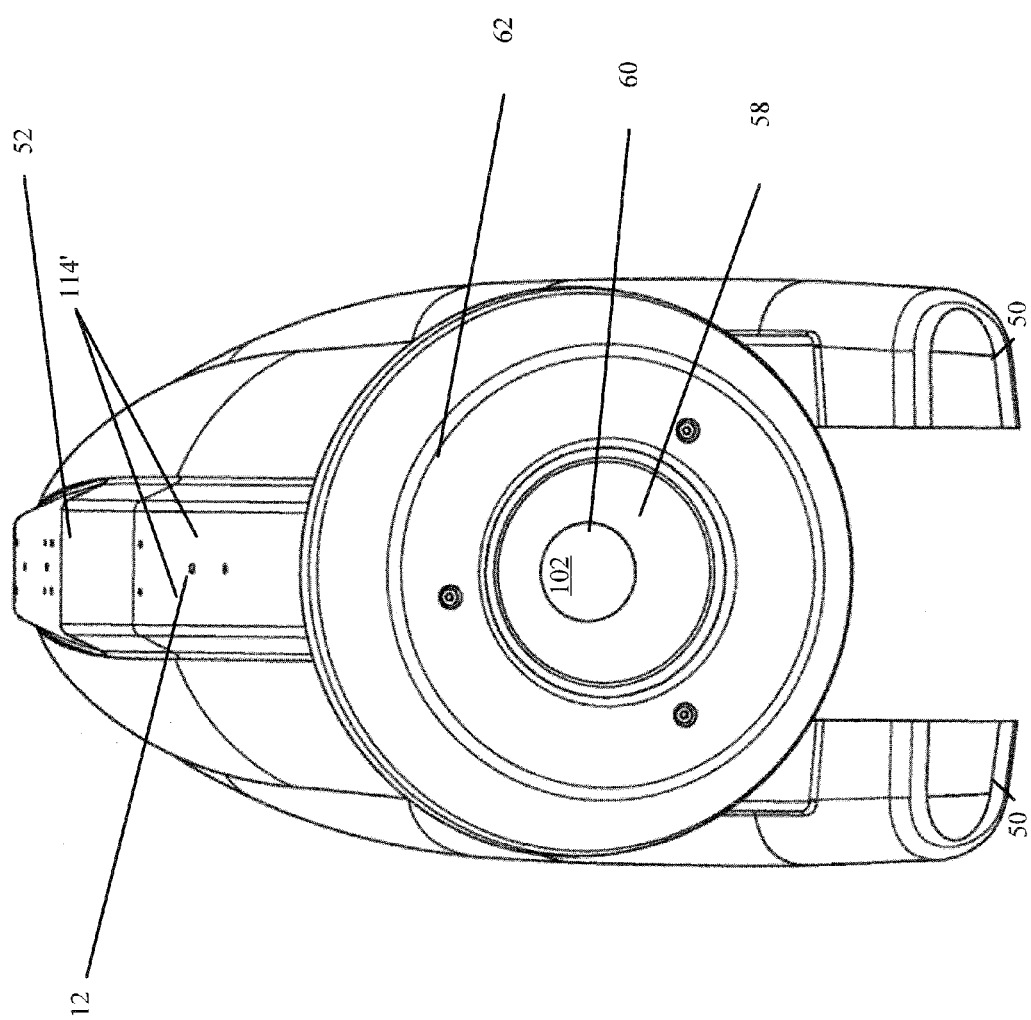
Figure 15C:
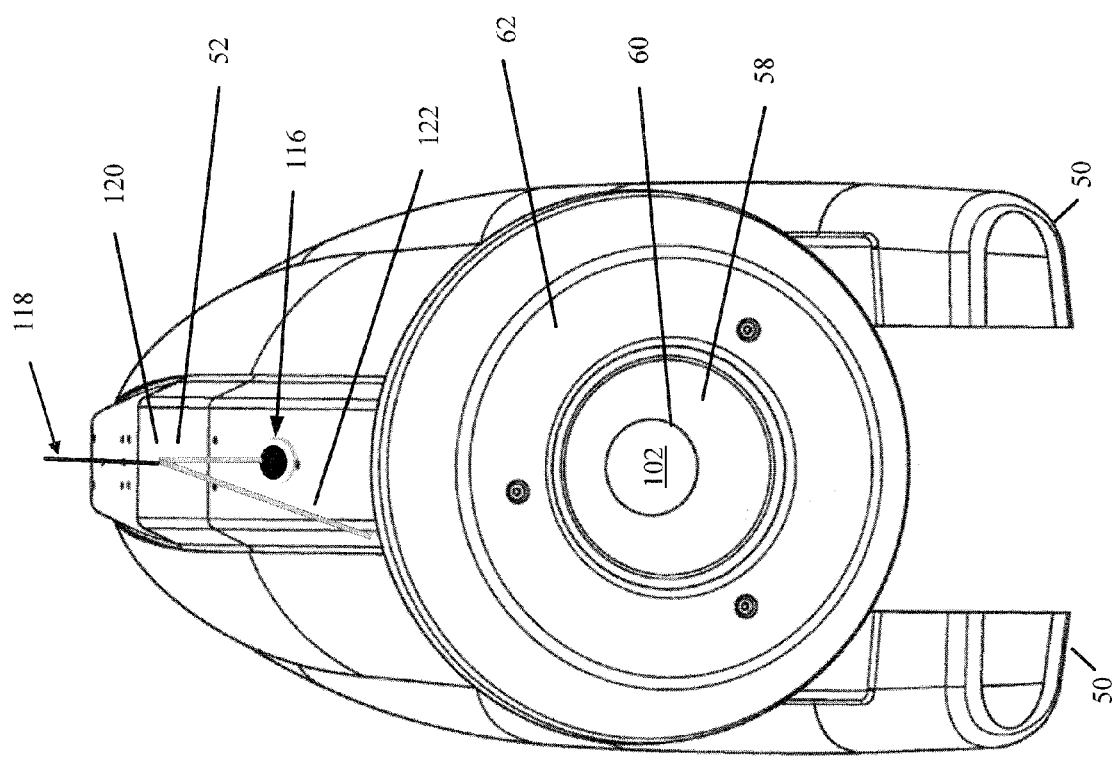

As discussed above when one or more energy converting apparatuses are deployed in the field it is advantageous for the device to automatically track on sun with a properly aligned beam. Typically, the beam is directed to a target region of interest such as an aperture. In FIG. 15A-15C various auto-commissioning embodiments are depicted.

When systems are commissioned (first operated with the sun) a step must first be performed to calibrate each system to account for each system's unique installation and mechanical differences. While each system's operating system includes an algorithm for locating the position of the sun relative to that system's latitude, longitude, elevation and time, that sun position must be corrected for additional errors and imperfections, such as a mirror post that is not completely vertical, mirror pointing error, or tolerance stack up in the system. Once the corrections are quantified, the system can accurately move the dish to position the beam of concentrated light in the aperture, open-loop (with no feedback from sensors).

Typically, calibration involves a person manually steering the solar reflector to center the solar beam in the aperture 60. Once the beam is centered, the software can calculate the system-unique errors and store them in memory. If the errors do not change over time, re-calibration is never needed. Auto-commissioning refers to a system's ability to determine the system-specific errors and calibrate itself without manual assistance. For a large field of systems, auto-commissioning reduces the time to operability after installation, and reduces the probability of error (and equipment damage) introduced by manual steering.

An auto-commissioning algorithm determines the system-specific errors that, when added to the generic sun position coordinates allow each system to accurately position the concentrated beam in the receiver aperture 60, open-loop. Since the physical position of the aperture center relative to sensor positions is known and constant, sun (light and/or heat) feedback from sensors is used to quantify the system-specific errors and complete the calibration. As the beam of concentrated sunlight may damage sensors and system surfaces if moved too slowly over them, it may require that minimum slew speeds be observed to avoid this damage. In this case, there may be time delays from the time the beam passes over a sensor and the time that sensor registers a maximum temperature. In this case, the algorithm must also account for thermal time constants of the sensors and materials when inferring beam position relative to sensor readings. The sensors can be located near the aperture or a larger distance from the aperture. The location of the sensors relative to the location of the aperture is a physical constant of the design.

One method for auto-commissioning has sensors located around the aperture as shown in FIG. 15A. The beam can be moved across the sensors 114 or stopped on or near the sensors so that sensor feedback can be used to intuit the beam's position. If the sensors are thermocouples, for example, the beam can be moved vertically down and up until the temperature of the sensors on the left are close to the sensors on the right of the slew cone. This would determine the location of the aperture in the horizontal position. This same method could be used by passing the beam horizontally over the sensors to determine the location of the aperture in the vertical direction.

Another method for auto-commissioning has sensors located away from the aperture 60 as shown in FIG. 15B. A similar method could be used as described above, or the beam could be stopped when the thermocouples are close to the same temperature. The distance from the sensors 114' to the aperture 60 would be a known physical constant of the design, so the software would be capable of moving the beam to the center of the aperture once the location of the beam relative to the sensors is determined through sensor feedback. This method would potentially be preferred since the solar flux concentration further from the aperture is less, and the likelihood of melting components may be reduced.

Another method for auto-commissioning uses a photodiode to sense the presence or absence of direct sunlight 12 as shown in FIG. 15C. One way to do this would be to locate an object 118 (e.g., a post) to cast a shadow on the photodiode 116 when the dish is centered in the azimuth (horizontal) direction. Once centered in the horizontal direction, the beam 12 could be lowered into the aperture 60. The height of the post and photodiode 116 could be located so that the photodiode 116 goes from shaded 120 to in direct sunlight 122 at the moment the beam would be centered in the aperture. The beam would therefore be centered vertically and auto-commissioning would be completed.

Due to additional factors such as dish elevation angle or wind velocity, an algorithm that only seeks to balance the temperatures from sensors distributed around the receiver's aperture may not achieve the intended result, which is to maximize energy into the receiver. For example, a convective effect exists whereby heat energy escapes the cavity receiver. Since heat rises, this escaping energy heats the uppermost sensor(s) more than the bottom sensor(s). The degree of imbalanced heating depends on cavity receiver elevation angle (which is directly related to dish elevation angle), as the higher the elevation angle, the lower the convective effect. Other factors influence the convective effect, such as solar DNI, and wind velocity. As a result of this effect, an algorithm that seeks to balance sensor feedback will respond to the heating of the uppermost sensor(s) by positioning the beam slightly downward of the aperture center, resulting in less than maximum energy into the receiver.

One approach to address effects, such as the convective effect, which influences elevation angle only, is to position the dish until the flux sensor feedback is balanced, and then make elevation adjustments (net upwards) away from balanced feedback, until the average (or sum) temperature of all sensors is minimized. By minimizing the average, the beam is ensured to be centered in the aperture, regardless of the convective effect.

Alternatively to using flux sensors for sensor feedback, an algorithm may use engine power or head temperature (and/or its first derivative) for feedback; making dish position adjustments to maximize either of those feedback parameters. In a solar application, where energy into the engine's receiver can vary with factors such as solar radiation (insolation), wind velocity, and elevation angle of the cavity receiver, external references, such as from a DNI (direct-normal insolation) sensor, wind-velocity anemometer, etc., may be used in conjunction with feedback from engine power or head temperature. In this way, as the algorithm makes dish position adjustments to maximize one of these feedback parameters, the system is able to differentiate changes in feedback that result from movements of the dish, versus changes that result from a change in DNI, cavity receiver elevation angle, or other weather conditions, such as wind velocity.

Various embodiments may be implemented in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, some or all of the processing of the sensor data collected is implemented as a set of instructions or signals that are processed by a computer, circuit, processor, board, or other electronic device.

Suitable programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured is the invention as defined and differentiated in the embodiments recited herein, including all equivalents.

What is claimed is:

1. An electrical circuit for use with a generator having an output port, the circuit to modify one of an electric current or voltage from the generator, the circuit comprising:
    a rectifier to convert an alternating current from the generator to direct current, the rectifier having a first port and a second port, the rectifier first port in communication with the output port of the generator;
    a direct current to alternating current inverter to convert the direct current from the rectifier to alternating current, the inverter having a first port and a second port, the first port of the inverter in communication with the second port of the rectifier, wherein the generator is a linear alternator positioned within an energy converting apparatus comprising a Stirling engine having a piston such that motion of the piston drives the linear alternator, and
    a processor-based system for controlling the energy converting apparatus, the energy converting apparatus having a first subsystem having a cold side temperature and a second subsystem having a hot side temperature, an engine working fluid disposed within a chamber, wherein the piston moves relative to the working fluid, the processor-based system comprising:
    an electronic memory device; and
    an electronic processor in communication with the memory device and the energy converting apparatus, wherein the memory device comprises instructions that when executed by the processor cause the processor to:
    store an empirically obtained dataset of energy converting apparatus operating parameters; and
    determine an operating temperature ratio, wherein the operating temperature ratio is the ratio of the cold side temperature to the hot side temperature.

2. The electrical circuit of claim 1 further comprising a tuning capacitor positioned between the rectifier and the generator, the tuning capacitor having a first port and a second port, the first port in communication with the generator output port and the second port in communication with the first port of the rectifier.

3. The electrical circuit of claim 2 further comprising a stall circuit having a first port in communication with one of the first and second ports of the tuning capacitor.

4. The electrical circuit of claim 3 further comprising an auxiliary power supply having a first port in communication with the second port of the rectifier,
    wherein the auxiliary power supply extracts energy from the output of the rectifier.

5. The electrical circuit of claim 4 wherein the auxiliary power supply is in electrical communication with an electrical energy storage device.

6. The electrical circuit of claim 4 wherein the second port of the inverter is in communication with an electrical grid and wherein the auxiliary power supply extracts energy from the grid using one of the first port of the inverter if the rectifier is not supplying energy to the output of the rectifier.

7. The electrical circuit of claim 1,
    wherein the memory device comprises instructions that when executed by the processor cause the processor to:
    monitor changes in a first derivative with respect to time of a temperature at a region of the energy converting apparatus; and
    varying an operational state of a control system in response to a change in the first derivative with respect to time of the temperature.

8. The electrical circuit of claim 1 wherein the circuit further comprises a switch having a first port and a control port, the first port in communication with the second port of the inverter.

9. The electrical circuit of claim 8 further comprising a system controller having a first port, a second port, a third port and a fourth port, the first and second controller ports in communication with the first rectifier port and the third and fourth controller ports in communication with second port of the inverter,
   wherein the switch comprises a third port in electrical communication with a power grid;
   wherein the first controller port is a single phase voltage sense port,
   wherein the second controller port is a single phase current sense port,
   wherein the third controller port is a 3 phase voltage sense port and is in electrical communication with the switch, and
   wherein the fourth controller port is a 3 phase current sense port and is in electrical communication with the third port of the switch.

10. The electrical circuit of claim 1 further comprising a system controller having a first port, a second port, a third port and a fourth port, the first and second controller ports in communication with the first rectifier port and the third and fourth controller ports in communication with second port of the inverter,
   wherein the first controller port is a single phase voltage sense port,
   wherein the second controller port is a single phase current sense port,
   wherein the third controller port is a 3 phase voltage sense port, and
   wherein the fourth controller port is a 3 phase current sense port.

11. The electrical circuit of claim 1, wherein the circuit comprises:
   a tuning capacitor in electrical communication with the linear alternator; and
   a stall circuit comprising an electrical load in electrical communication with the tuning capacitor such that the stall circuit in combination with the tuning capacitor has a predetermined resonant frequency and bandwidth such that when the stall circuit is connected to the linear alternator the Stirling engine enters a stall state, wherein the linear alternator has at least one operating frequency, the Stirling engine powered by incident solar energy.

12. The electrical circuit of claim 11 wherein the stall circuit is selected from the group of a resistor, a resistor and capacitor, a pair of capacitors, and a brake.

13. The electrical circuit of claim 11 wherein the bandwidth ranges from about 58 Hz to about 72 Hz and the predetermined resonant frequency is approximately 62 Hz.

14. The electrical circuit of claim 11 wherein the stall circuit comprises a resistor capacitor pair, the resistor capacitor pair when in communication with the tuning capacitor generates an impedance that when connected to the linear alternator stalls the linear alternator.

15. The electrical circuit of claim 11 wherein the stall circuit has an associated bandwidth sized to stall an energy converting apparatus component selected from the group consisting of an engine having at least one piston, a passive balancer, and the linear alternator.

16. The electrical circuit of claim 11 wherein the circuit is used with a passive balancer connected to a case which houses the Stirling engine and wherein a circuit component value of at least one circuit component in the stall circuit is selected in response to at least one resonance frequency associated with a moving mass component of the energy converting apparatus.

17. The electrical circuit of claim 1, wherein the energy converting apparatus comprises a motor controller for a positioning an object, the motor controller comprising:
   a DC brushless motor having a Hall sensor, a Hall sensor port; and a motor driver having a motor driver port;
   a gear box in communication with the DC brushless motor and having a gear ratio greater than 200:1; and
   a position controller having an input port in communication with the Hall sensor and an output port in communication with the motor driver port,
   wherein the Hall sensor provides information for commutation control to the motor driver and motion information to the position controller for position determination of the object.

18. An electrical circuit for use with a generator having an output port, the circuit to modify one of an electric current or voltage from the generator, the circuit comprising:
   a rectifier to convert an alternating current from the generator to direct current, the rectifier having a first port and a second port, the rectifier first port in communication with the output port of the generator;
   a direct current to alternating current inverter to convert the direct current from the rectifier to alternating current, the inverter having a first port and a second port, the first port of the inverter in communication with the second port of the rectifier, wherein the generator is a linear alternator positioned within an energy converting apparatus comprising a Stirling engine having a piston such that motion of the piston drives the linear alternator;
   a processor-based system for controlling the energy converting apparatus, the energy converting apparatus having a first subsystem having a cold side temperature and a second subsystem having a hot side temperature, an engine working fluid disposed within a chamber, wherein the piston moves relative to the working fluid, wherein the energy converting apparatus comprises a linear alternator and the piston amplitude is approximated by a control voltage associated with the linear alternator, the processor-based system comprising:
   an electronic memory device; and
   an electronic processor in communication with the memory device and the energy converting apparatus, wherein the memory device comprises instructions that when executed by the processor cause the processor to:
   store an empirically obtained dataset of energy converting apparatus operating parameters; and
   determine an operating temperature ratio, wherein the operating temperature ratio is the ratio of the cold side temperature to the hot side temperature.

19. The electrical circuit of claim 18 wherein the operating temperature ratio is determined by correlating electric power, charge pressure of engine working fluid, and piston amplitude using the dataset of energy converting apparatus operating parameters.

20. The electrical circuit of claim 1 wherein the energy converting apparatus comprises a linear alternator and the piston amplitude is approximated by a control voltage associated with the linear alternator.

21. An electrical circuit for use with a generator having an output port, the circuit to modify one of an electric current or voltage from the generator, the circuit comprising:
   a rectifier to convert an alternating current from the generator to direct current, the rectifier having a first port and a second port, the rectifier first port in communication with the output port of the generator;
   a direct current to alternating current inverter to convert the direct current from the rectifier to alternating current, the inverter having a first port and a second port, the first port of the inverter in communication with the second port of the rectifier, wherein the generator is a linear alternator positioned within an energy converting apparatus comprising a Stirling engine having a piston such that motion of the piston drives the linear alternator;

a processor-based system for controlling the energy converting apparatus, the energy converting apparatus having a first subsystem having a cold side temperature and a second subsystem having a hot side temperature, an engine working fluid disposed within a chamber, and a piston which moves relative to the working fluid, the processor-based system comprising:

an electronic memory device; and an electronic processor in communication with the memory device and the energy converting apparatus, wherein the memory device comprises instructions that when executed by the processor cause the processor to:

store an empirically obtained dataset of energy converting apparatus operating parameters; and determine an operating temperature ratio, wherein the operating temperature ratio is the ratio of the cold side temperature to the hot side temperature, wherein the operating temperature ratio is determined inferentially such that a direct temperature measurement is not used.

* * * * *